(12) United States Patent
Long

(10) Patent No.: US 7,467,972 B2
(45) Date of Patent: *Dec. 23, 2008

(54) DUAL STACKED CONNECTOR

(75) Inventor: Jerry A. Long, Elgin, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/881,869

(22) Filed: Jul. 30, 2007

(65) Prior Publication Data
US 2007/0270031 A1    Nov. 22, 2007

(51) Int. Cl.
*H01R 13/50* (2006.01)

(52) U.S. Cl. .................. 439/541.5; 439/607; 439/608; 439/490

(58) Field of Classification Search .............. 439/541.5, 439/607, 490, 608
See application file for complete search history.

(56) References Cited

U.S. PATENT DOCUMENTS

| | | | |
|---|---|---|---|
| 4,887,876 A | 12/1989 | Fricke et al. | |
| 5,254,010 A | 10/1993 | Davis | |
| 5,399,105 A | 3/1995 | Kaufman et al. | |
| 5,531,612 A | 7/1996 | Goodall et al. | |
| 5,795,191 A | 8/1998 | Preputnick et al. | |
| 5,876,239 A | 3/1999 | Morin et al. | |
| 5,879,173 A | 3/1999 | Poplawski et al. | |
| 5,951,330 A | 9/1999 | Reichard et al. | |
| 5,961,350 A | 10/1999 | Shiu | |
| 6,095,827 A | 8/2000 | Dutkowsky et al. | |
| 6,095,862 A | 8/2000 | Doye et al. | |
| 6,113,422 A | 9/2000 | Somerville et al. | |
| 6,183,292 B1 | 2/2001 | Chen et al. | |
| 6,206,725 B1 | 3/2001 | Wu | |
| 6,264,499 B1 | 7/2001 | Costello et al. | |
| 6,276,963 B1 | 8/2001 | Avery et al. | |
| 6,283,786 B1 | 9/2001 | Margulis et al. | |
| 6,352,446 B2 | 3/2002 | Ezawa et al. | |
| 6,354,875 B1 * | 3/2002 | Wu | 439/607 |

(Continued)

FOREIGN PATENT DOCUMENTS

DE    196 40 847 A1    4/1999

(Continued)

OTHER PUBLICATIONS

"Interconnections", Machine Design, Jun. 1993, pp. 459-478.

(Continued)

*Primary Examiner*—T C Patel
*Assistant Examiner*—Harshad C Patel
(74) *Attorney, Agent, or Firm*—Thomas D. Paulius

(57) ABSTRACT

A small size connector has an insulative housing and two edge card-receiving slots disposed in a stacked arrangement with in the connector housing. Each slot receives an edge card of an electronic module therein. The slots support conductive terminals that extend from a plurality of individual terminal assemblies. The terminal assemblies include clip members that engage an opposing shoulder formed on the interior of the connector housing. The front face of the connector is provided with various engagement openings that receive engagement members of light pipe assemblies and shielding assemblies, so that when assembled, the connector, shield, terminal assemblies and light pipes all act as a single, integrated component.

9 Claims, 33 Drawing Sheets

U.S. PATENT DOCUMENTS

| | | | |
|---|---|---|---|
| 6,364,700 B1 * | 4/2002 | Zhu et al. | 439/567 |
| 6,468,108 B1 * | 10/2002 | Wu | 439/567 |
| 6,517,382 B2 | 2/2003 | Flickinger et al. | |
| 6,669,514 B2 | 12/2003 | Wiebking et al. | |
| 6,764,349 B2 | 7/2004 | Provencher et al. | |
| 6,848,917 B2 | 2/2005 | Lang et al. | |
| 6,890,215 B2 | 5/2005 | Lang et al. | |
| 6,921,291 B2 | 7/2005 | Shih | |
| 6,969,280 B2 | 11/2005 | Chien et al. | |
| 7,037,138 B2 | 5/2006 | Lang et al. | |
| 7,070,446 B2 * | 7/2006 | Henry et al. | 439/541.5 |
| 2002/0025720 A1 | 2/2002 | Bright et al. | |
| 2002/0146926 A1 | 10/2002 | Fogg et al. | |
| 2002/0197043 A1 | 12/2002 | Hwang | |
| 2005/0254257 A1 | 11/2005 | Long | |
| 2005/0254772 A1 | 11/2005 | Long et al. | |
| 2006/0003628 A1 | 1/2006 | Long et al. | |
| 2006/0003632 A1 | 1/2006 | Long et al. | |

FOREIGN PATENT DOCUMENTS

| | | |
|---|---|---|
| EP | 0 658 953 | 6/1995 |
| EP | 0 945 933 | 9/1999 |
| WO | WO 96/27920 | 9/1996 |
| WO | WO 00/22697 | 4/2000 |
| WO | WO 03/093888 | 11/2003 |

OTHER PUBLICATIONS

Search Report in International Patent Application No. PCT/US2005/017149, Jul. 22, 2005.

Office Action in U.S. Appl. No. 11/170,046, mailed Jun. 6, 2006.

* cited by examiner

FIG.24A
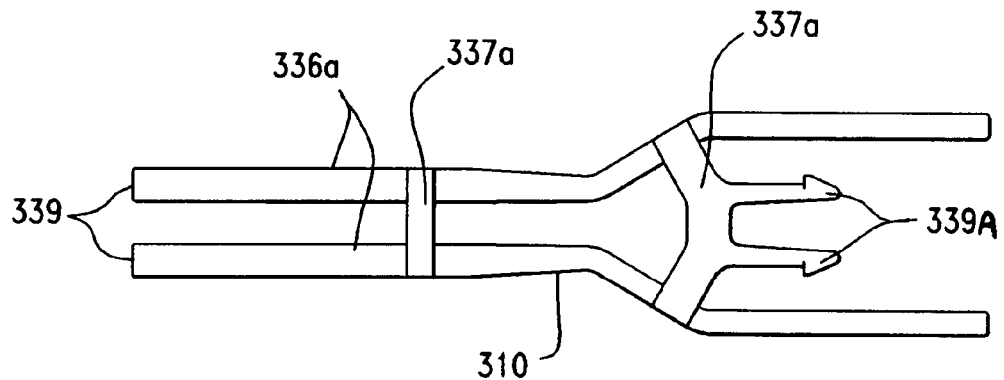
FIG.24B
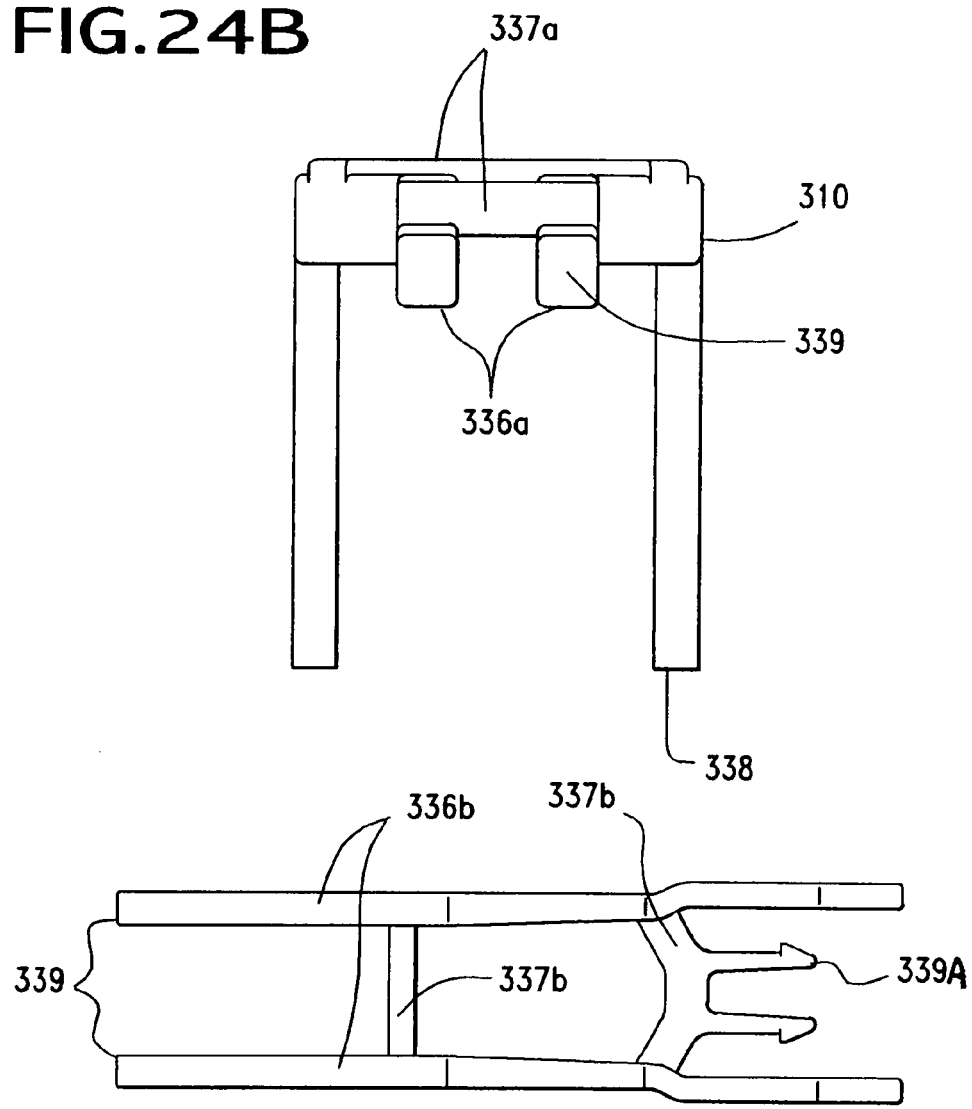
FIG.25A

DUAL STACKED CONNECTOR

REFERENCE TO RELATED APPLICATIONS

This application claims priority of prior U.S. Provisional Patent Applications Nos. 60/571,375, filed May 14, 2004 and 60/584,420, filed Jun. 30, 2004 and 06/584,421, also filed Jun. 30, 2004.

BACKGROUND OF THE INVENTION

This invention relates to electrical connector assemblies and, more particularly, to an small sized electrical connectors having a stacked arrangement.

Electrical connectors adapted for mounting to printed circuit boards are known in the art and are commonly used for connection between two electrical communication devices. In order to ensure that a proper connection has been made and therefore a link is created between the electrical communication devices, indicators may be incorporated into circuits on the printed circuit board. These indicators are typically light emitting diodes (LEDs) which are turned on when a circuit is completed between the mating connectors and the communication devices. Additionally LEDs can be mounted on the printed circuit board to indicate a number of other conditions including the passage of communications signals between the two communication devices, indication of power, or indication that an error in transmitting the signals has occurred.

A problem arises with these type of connectors because the terminals of the connector are usually stitched in from the rear of the connector. Stitched connector typically require a means to align the tails of the connector terminals to facilitate the insertion of the connector onto a circuit board. The use of tail aligners increase the overall size of the connector, thereby increasing the printed circuit board "real estate" occupied by the connector.

Small size connectors must usually be inserted into an exterior shielding cage by way of a bottom opening. When a dual connector of a stacked arrangement, i.e., one which is intended to mate with two electronic modules in a vertically spaced arrangement, is desired, such a connector cannot be practically inserted into a shielding cage by way of a bottom opening because of the intervening horizontal wall of the shielding cage.

The present invention is therefore directed to a connector having a construction that overcomes the aforementioned disadvantages and which easily mates with a shielding cage intended to provide electromagnetic interference shielding around electronic modules that engage the connector.

SUMMARY OF THE INVENTION

Accordingly, it is a principal object of the present invention to provide a small form factor circuit board connector in a stacked configuration having engagement faces thereof spaced vertically apart.

Another object of the present invention is to provide a dual engagement connector component that is engageable with a light pipe assembly, the dual engagement connector component having two engagement areas vertically spaced apart from each other on the component and which are each surrounded by a metal shield component, the shield component defining two distinct module-receiving bays which are separated by an intervening space, the light pipe assembly extending from the connector component forwardly through the intervening space to provide at least a pair of indicator lights near the front of the module-receiving bays, the light pipe assembly engaging the sides or front of the connector component.

Yet another object of the present invention is to provide a connector for use with a shielded assembly having two bays, the connector having two engagement slots that receive edges of circuit cards that are associated with electronic modules, the connector having a plurality of terminal assemblies, each of which holds a plurality of conductive terminals in a selected arrangement, the terminals being housed in an insulative skeletal frame.

A further object of the present invention is to provide a connector having a small form factor and dual card engagement slots spaced apart vertically in a housing of the connector, the connector housing having at least one slot formed on a front face thereof for receiving engagement members of a shielding assembly.

Still another object of the present invention is to provide a terminal assembly for the aforementioned connectors, wherein the terminal assemblies each include an insulative frame that houses a plurality of conductive terminals, and the frame includes an engagement member that extends forwardly from the frame and engages a ledge of the housing to assist in orienting the terminal assembly in the connector cavity.

The present invention accomplishes these and other object by way of its structure. A connector housing is provided with an internal cavity formed therein that opens to the rear of the connector housing. This cavity accommodates a plurality of individual terminal assemblies. Each terminal assembly includes a dielectric frame that supports a plurality of conductive terminals. The terminals have aright-angle configuration, with tail portions of the compliant pin style preferably disposed along one edge of the frame and with individual contact portions disposed along another and preferably adjacent edge of the terminal assembly frame.

These terminal assemblies are inserted into the cavity so that the contact portions are received within terminal-receiving cavities formed in the connector housing. The terminal assemblies also preferably include engagement members which may take the form of clips disposed along the same edge as the contact portions and these clips engage a shoulder formed in the connector housing within the connector cavity.

The internal cavity of the connector housing accommodates the terminal assemblies and a shoulder member is provided therein as a member for the terminal assemblies to engage and maintain their orientation within the housing. The front face of the connector housing may be provided with slots or cavities disposed between the two card engagement slots. These other slots receive corresponding opposing engagement members, preferably in the form of tabs, that extend from a portion of an exterior shielding assembly and which portion provides an intervening shielding wall of an associated shielding assembly that divides the assembly into two distinct module-receiving bays. These slots are preferably positioned outside of the openings into which the light pipe engagement members are inserted.

The front of the connector component may have one or more engagement slots of cavities formed therein which engage a light pipe assembly. By this frontal engagement, the sides of the connector housing need not be modified to engage the light pipes in any fashion, so as to maintain the reduced size of the connector component. The light pipe assembly may include hooks that are integrally formed with the light pipes as a preferable means of attachment. The light pipe assembly may utilize distinct first and second pairs of light pipes, and each such pair may utilizes its own set of engagement hooks for engaging the connector component in the manner described above.

These and other objects, features and advantages of the present invention will be clearly understood through a consideration of the following detailed description

BRIEF DESCRIPTION OF THE DRAWINGS

The invention will now be described by way of example with reference to the following figures of which:

FIG. 24A is a top plan view of the first, or inner pair of light pipes;

FIG. 24B is a front elevational view of FIG. 24A showing the inner pair of light pipes;

FIG. 25A is a top plan view of the second, or outer, pair of light pipes;

DETAILED DESCRIPTION OF THE INVENTION

Figure 1:
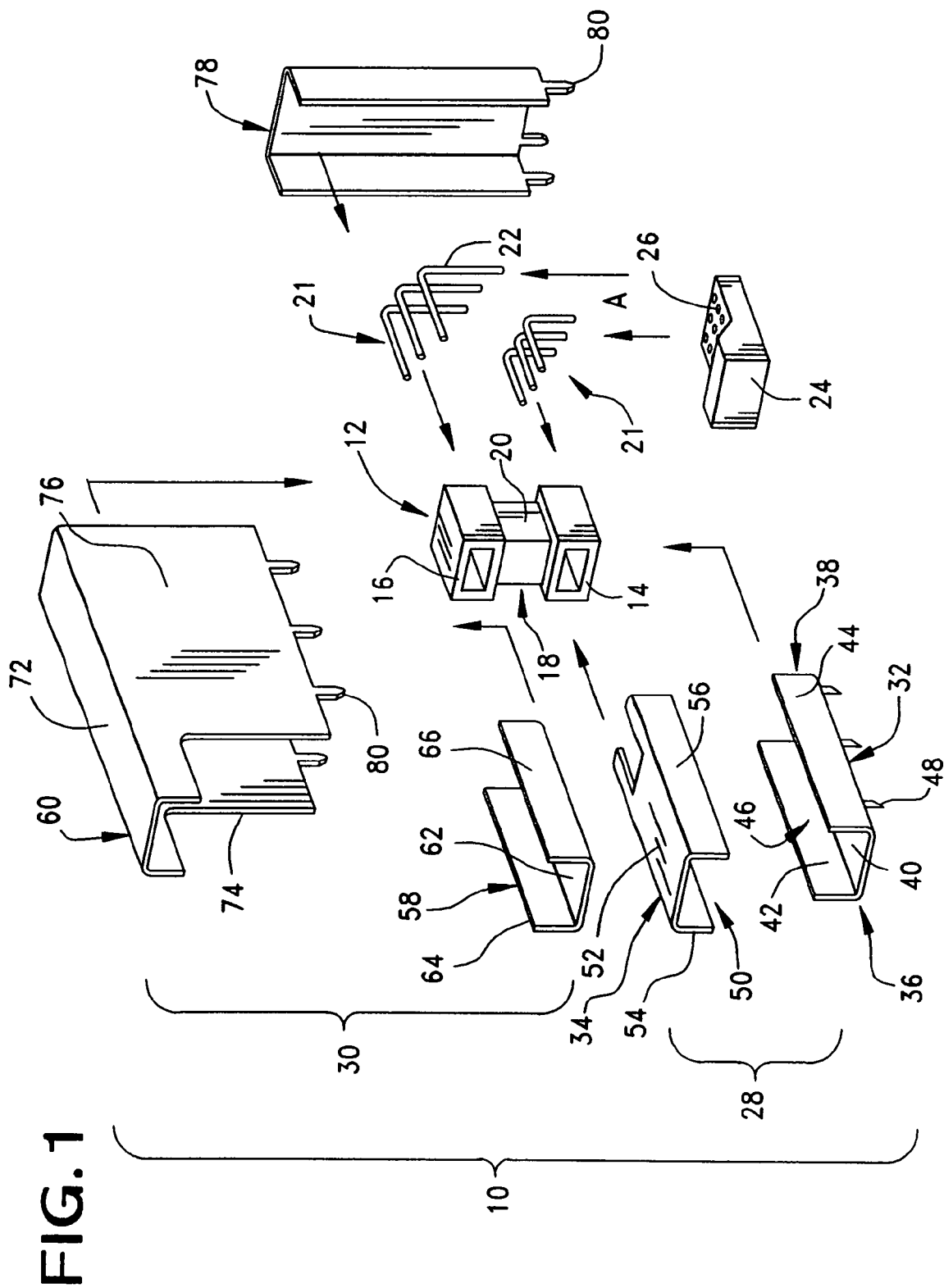
FIG. 1 is an exploded perspective view of a portion of a connector assembly constructed in accordance with the principles of the present invention.
Figure 2:
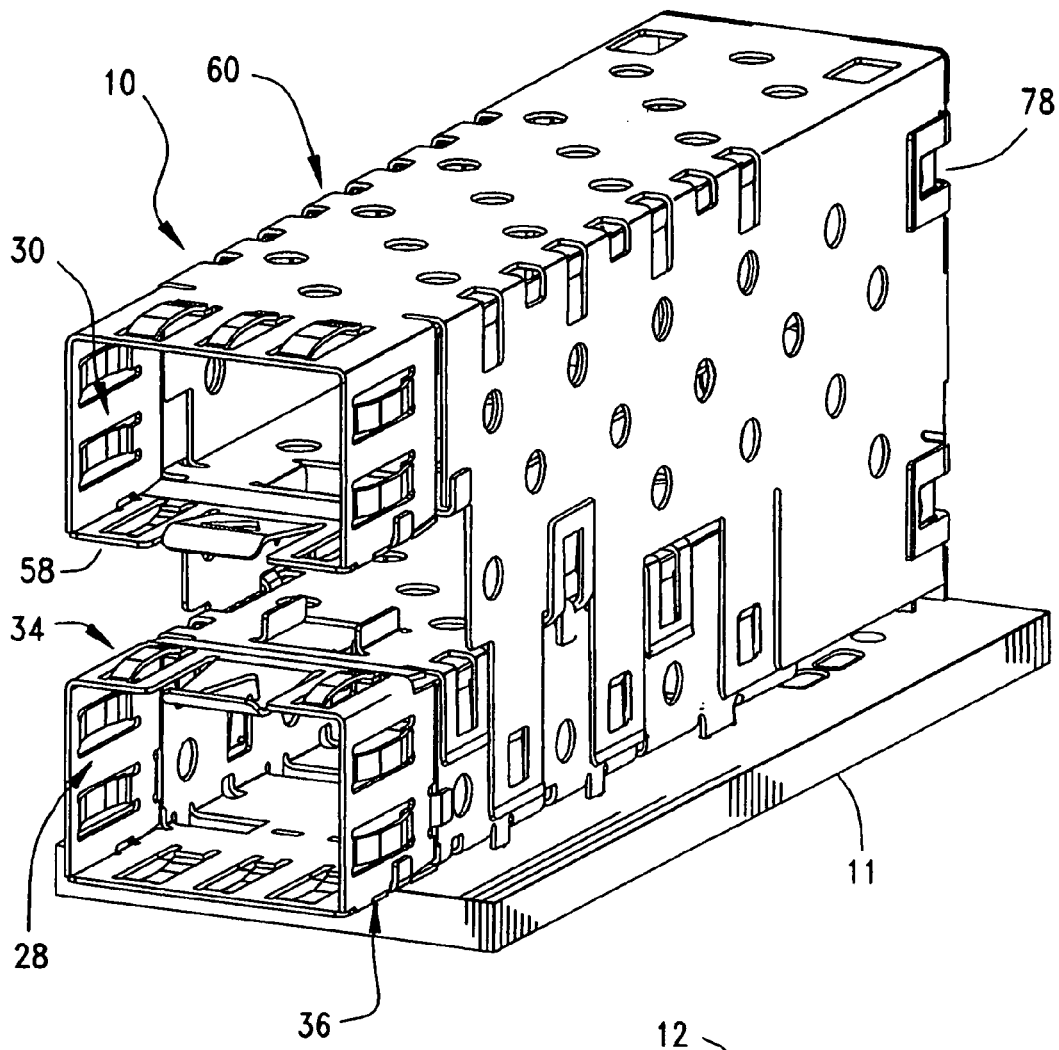
FIG. 2 is a perspective assembled view of the portion of the connector assembly shown in FIG. 1.
Figure 3:
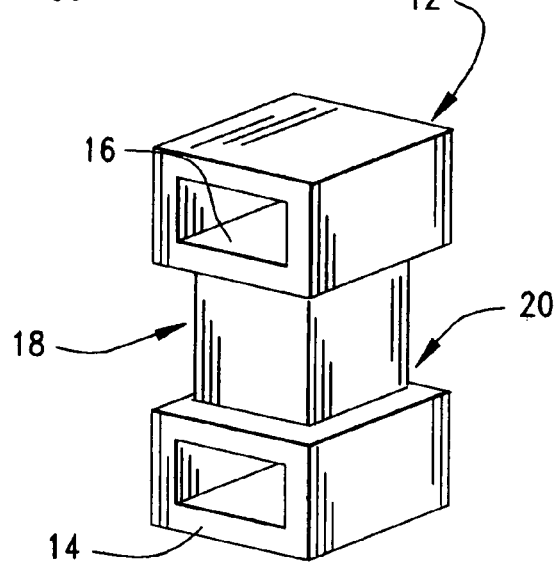
FIG. 3 is a perspective view of a connector housing incorporated into the assembly shown in FIG. 1.

A connector assembly 10 of the present invention will now be described generally with reference to FIGS. 1-3. The connector assembly 10 is designed for mounting on a printed circuit board 11. Connector assembly 10 comprises a connector housing 12 defining a pair of ports 14, 16 each adapted for receiving a portion of a mating connector (not shown). Herein, the housing port 14 will be referred to as the "lower port", and housing port 16 will be referred to as the "upper port", but it will be understood that such terms as "upper", "lower", etc. are used in this description to facilitate an understanding of the invention and are not intended to be limiting.

Upper and lower ports 14, 16 each have a plurality of conductive terminals 21 mounted therein for engaging complementary terminals of a mating connector (not shown). To permit space for latching mechanisms for releasably securing connector assembly 10 in a mated condition with a complementary mating connector, a cavity 18 may be formed between upper port 16 and lower port 14 of connector housing 12. Recesses 20 may be formed in side portions of housing 12, for purposes to be described below. Recesses 20 may be in communication with housing cavity 18.

Connector housing 12 may be molded from an insulative, thermoplastic material. The terminals are mounted in the upper port 16 and the lower port 14 and each terminal has contact portions at an end thereof (not shown) for engaging complementary contact portions of the terminals of the mating connector, and tail portions 22 projecting rearwardly from the contact portions and extending downwardly toward printed circuit board 11 for electrical connection to respective traces thereon via through holes formed in (or surface mount pads formed on a surface of) printed circuit board 11. A tail aligner 24 may be attached to connector housing 12 using any one of a variety of known methods, such as a snap-fit, press-fit or mechanical fasteners. The tail aligner 24 includes a plurality of through holes 26 formed therein and which are configured to match the arrangement of terminal tail portions 22 extending downward toward printed circuit board 11. The tail aligner 24 is mounted onto tail portions 22 of the terminals in the direction of arrow "A" (FIG. 1) and it sits on the surface of the circuit board 11.

A pair of shielding cage assemblies 28, 30 are secured to connector housing 12, with the cage assemblies including a lower cage assembly 28 that is secured to housing 12 to substantially enclose lower port 14 thereof, and an upper cage assembly 30 that is secured to the housing 12 to substantially enclose the upper port 16 thereof. The cage assemblies 28, 30 are typically formed using a material, such as sheet metal or plated plastic, which conducts and guides magnetic and electric field energy so as to aid in shielding circuit elements positioned proximate connector assembly 10 from electromagnetic interference (EMI).

The lower cage assembly 28 typically includes two interengaging pieces, a lower base component 32 and a lower cover component 34. The lower base component 32 has a general U-shaped configuration when viewed from the front or rear ends, 36, 38 respectively. As such, the lower base component 32 typically includes three sides, or walls: a base or bottom wall 40 and two sidewalls 42, 44 that extend upwardly from the bottom wall 40 and which are spaced apart from each other to define a channel 46 therebetween, into which a portion of the connector housing 12 fits. As seen in FIGS. 1 and 2, the front and rear portions of lower base component 32 are left open.

The lower base component 32 is stamped and formed from metal. The lower base component 32 may alternatively be formed using other conductive materials, such as metal-plated plastic or the like. Lower cover component 34 may also be formed is a similar manner. Generally, the cover component 34 has a length that matches a corresponding length of lower base component 32, and a width that is equal to or slightly greater than a corresponding width of the lower base component 32. The lower cover component 34 is bent, into a general U-shaped configuration when looking at it from its front end 50. In this fashion, it includes top wall 52 and two spaced-apart side walls 54, 56. Lower base component 32 and lower cover component 34 interengage along respective sidewalls thereof the form an enclosure for at least partially enclosing lower housing Port 14 of connector housing therein. As seen in FIGS. 1 and 2, the front and rear portions of the lower cage assembly 28 are left open. Details of this type of shielding cage are provided in U.S. Pat. No. 6,443,768, which issued on Sep. 3, 2002 and is incorporated herein by reference.

The structure of upper cage assembly 30 is similar to that of lower cage assembly 28 and it includes two interengaging pieces: an upper base component 58 and an upper cover component 60. The upper base component 58 has a bottom wall 62 and two spaced-apart sidewalls 64, 66. The upper cover component 60 has a top wall 72 and two spaced apart sidewalls 74, 76. These sidewalls 74 and 76 interengage the upper base component as shown in order to form an enclosure similar to that formed by lower cage assembly 28, for at least partially enclosing an upper housing port 16 of the connector housing 12 . In addition, sidewalls 74, 76 of upper cover component 60 also extend toward printed circuit board 11 to substantially enclose side portions of both upper cage assembly 30 and lower cage assembly 28. The lower base component 32 may be provided with mounting pin portions 48 that are stamped out of the bottom wall 40 thereof and which are formed, or bent, so that they extend vertically with respect to the lower base bottom wall 40, and generally in the same plane as the sidewalls 42, 44. The mounting pin portions 48 are formed in a desired pattern to engage and mate with corresponding mounting holes on printed circuit board 11. Similar mounting pin portions 80 may be formed to extend along lower edges of extended sidewalls 74, 76 of the cover member 60 to engage mounting holes in printed circuit board 11. Connector assembly 10 also includes a separate rear wall 78 that is attachable to the upper and lower cage assemblies 28, 30. The rear wall 78 forms an enclosure surrounding the terminal tail portions 22, tail aligner 24 and the rear portion of connector housing 12 when attached to cage assemblies 28, 30, and the rear wall 78 includes mounting pin portions 80 extending from its bottom and extending vertically. The pin portions 80 engage mounting holes on printed circuit board 11.

Figure 4:
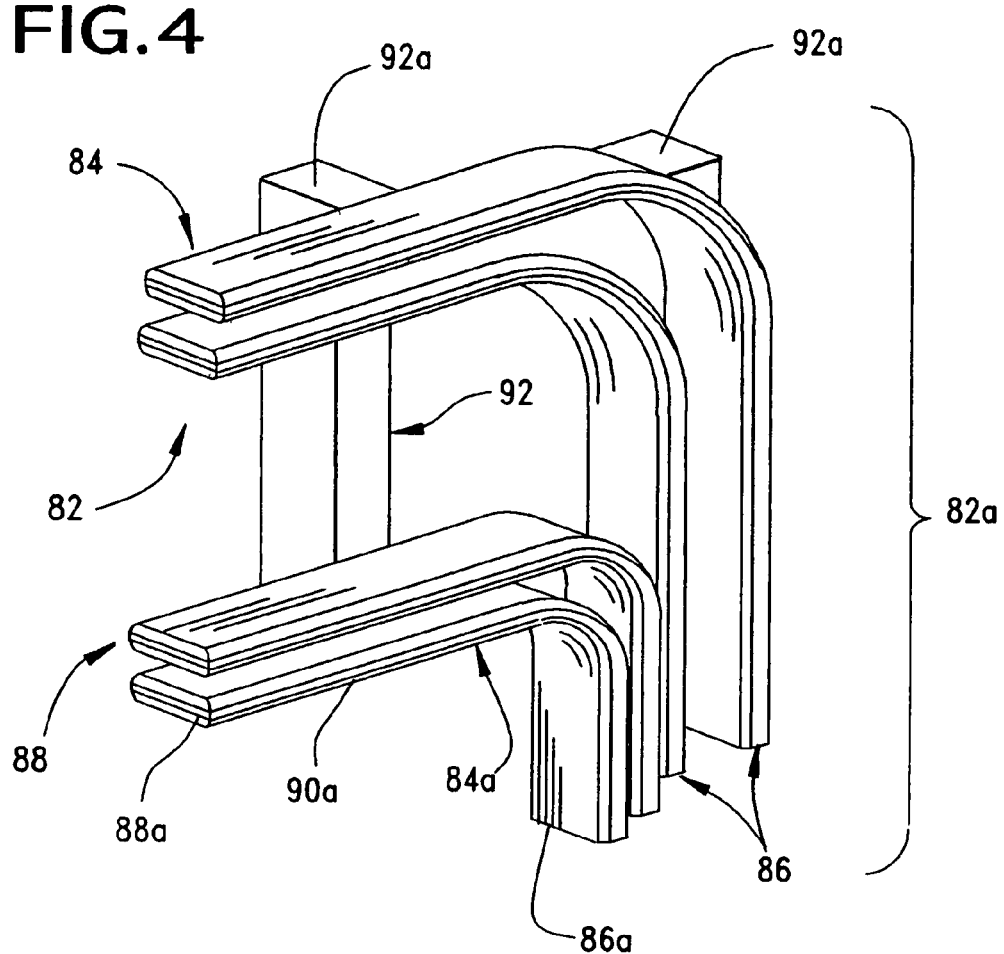
FIG. 4 is perspective view of a first embodiment of a light pipe assembly that may be used with the connector assembly of FIGS. 1-3.
Figure 5:
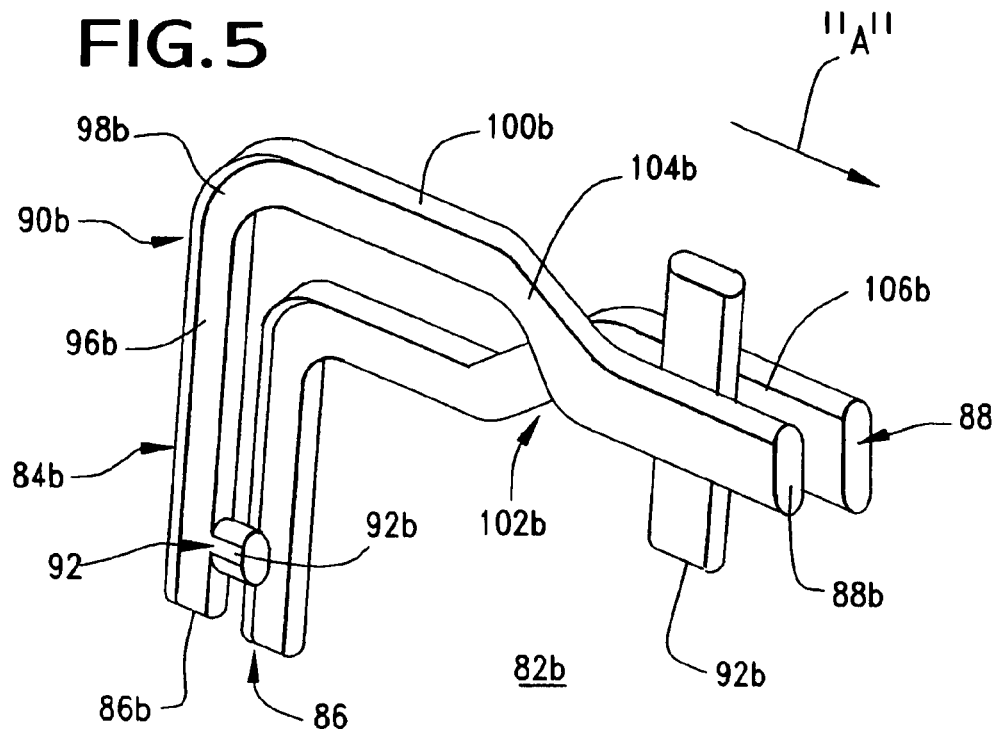
FIG. 5 is perspective view of a second embodiment of a light pipe assembly incorporated into the connector assembly of the present invention.

Referring to FIGS. 4-7, a light pipe assembly 82, is shown as part of the overall connector assembly 10. The light pipe assembly 82a of FIG. 4 will be referenced for the purpose of describing the basic components of the light pipe assemblies. However, it will be understood that light pipe assembly 82b of FIG. 5 has the same basic features as light pipe assembly 82a. Light pipe assembly 82 includes at least one light pipe 84 manufactured from a material suitable for carrying light, such as a plastic or glass. The pipes 84 are illustrated as pairs of pipes, with each pair shown extending alongside the shielding cage assembly of the connector assembly. FIGS. 4 & 5 show assemblies which are formed using multiple light pipes. The light pipes 84 may be color-coded and each light pipe 84 has a light-receiving input face 86, a light emitting output or display face 88, and a body portion 90 extending between the input and output faces. Light pipes 84 are shaped to carry light signals from input faces 86 through body portions 90 to output faces 88.

Portions of light pipes 84 may be affixed to one or more support members 92. Support members 92 provide a framework for positioning and securing light pipes 84 with respect to each other and with respect to cage assemblies 28, 30. Thus, portions of support members 92 may be formed so as to enable engagement with features on one of cage assemblies 28, 30. Support members 92 may be formed integral with light pipes 84. When the light pipe assembly 82 is mounted to cage assemblies 28, 30, input faces 86 of each light pipe 84 will be positioned so as to reside opposite a respective light source such as an LED on the circuit board 11.

Figure 6:
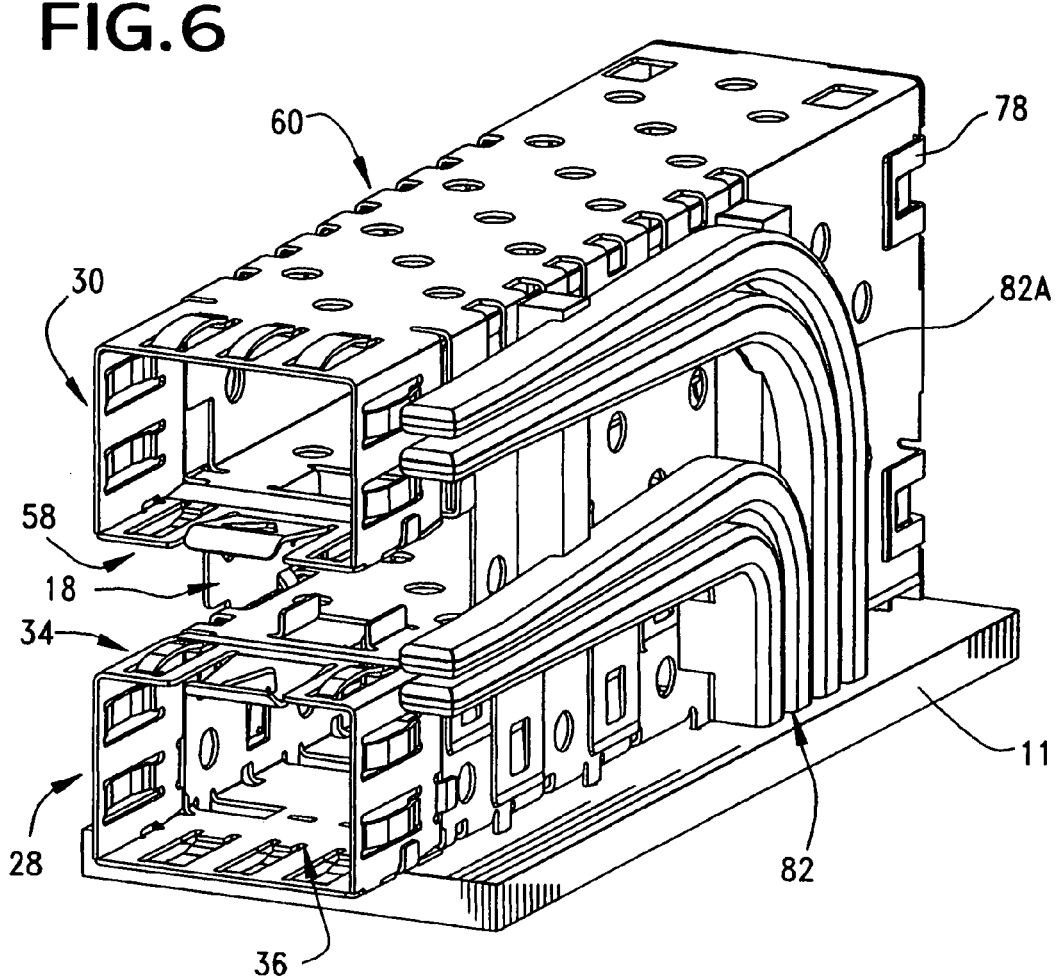
FIG. 6 is a perspective view of the light pipe assembly of FIG. 4 incorporated into the connector assembly, and extending along the sides thereof.

As shown in FIGS. 4 and 6, a light pipe assembly 82*a* is externally mounted with respect to cage assemblies 28, 30. FIGS. 4 and 6 show one possible configuration, in which two pairs of light pipes are spaced apart vertically and connected to a pair of support members 92*a*. Light pipe assembly 82*a* may be connected to one or more of the cage assemblies 28, 30 using any one of several known methods. Examples of possible attachment methods include a mating-type connection between complementary features formed in light pipe assembly 82*a* and cage assembly 28, 30, mechanical fasteners, or adhesives. A portion of light pipe assembly 82*a* may also be secured to printed circuit board. One or more light pipe assemblies 82*a* may also be mounted along multiple sides of connector assembly. Thus, the light pipe assembly 82*a* may be configured in any desired manner to enable attachment to an existing connector assembly and to convey light between light emitting elements and light receiving elements having any one of a variety of spatial locations with respect to the connector assembly.

The shapes of light pipes 84*a* and the dimensions and positioning of support members 92*a* may be chosen to convey light between light emitting elements and light receiving sensors having a wide variety of locations in relation to connector assembly 10. For example, as seen in FIG. 6, the configurations of light pipes 84*a* and support members 92*a* may be specified such that light pipe input faces 86*a* will receive light from respective LED's positioned on the circuit board 11 at various distances from connector assembly 10. Also, the configurations of light pipes 84*a* and support members 92*a* may be specified such that light pipe output faces 88*a* will emit light to light receiving sensors located at any one of a variety of distances from printed circuit board 11.

Referring to FIG. 5 a light pipe assembly 82*b* may be provided that includes one or more pairs of individual light pipes arranged in pairs. Each assembly 82*b* can be seen to include a pair of adjacent light pipes 84*b* that are attached to one or more support members 92*b*. The light pipes 84*b* each opposing input faces 86*b*, output faces 88*b* and body portions 90*b* that extend between the input and output faces 86*b*, 88*b*. In this embodiment, the light pipes are configured to be mounted within the upper cage cover component 60 as shown by the alternate embodiment arranged in FIG. 7. In this embodiment, the pipes extends within the connector housing recess 20 and cavity 18 formed between housing upper port 16 and housing lower port 14.

The light pipe assembly 82*b* may extend along a portion of tail aligner 24, behind connector housing 12 and the light pipe assembly 82*b* may be secured to the connector housing 12 such that light pipe input faces 86*b* reside opposite respective LED's mounted on printed circuit board 11 and light pipe output faces 88*b* reside opposite respective light receiving sensors (not shown) mounted on a separate item of electronic equipment. Body portions 90*b* are formed so as to connect input faces 86*b* and output faces 88*b* for conveying light from LED's to the light receiving sensors located proximate output faces 88*b*.

As may be seen in FIG. 5, the input faces 86*b* of light pipes 84*b* may be arranged in a "front-rear" configuration with respect to the mating direction of connector assembly 10 indicated by arrow "A". The body portions 90*b* of the light pipes 84*b* include vertical portions 96*b* extending upward from printed circuit board 11 and terminating in right angle bends 98*b*. Horizontal portions 100*b* of light pipes 84*b* extend from right angle bends 98*b* toward a front portion of the connector assembly, terminating in a transition region, generally designated 102*b*. It may be seen from FIG. 5 that horizontal portions 100*b* extending forward from right angle bends 98*b* have an "over-and-under" orientation.

Figure 7:
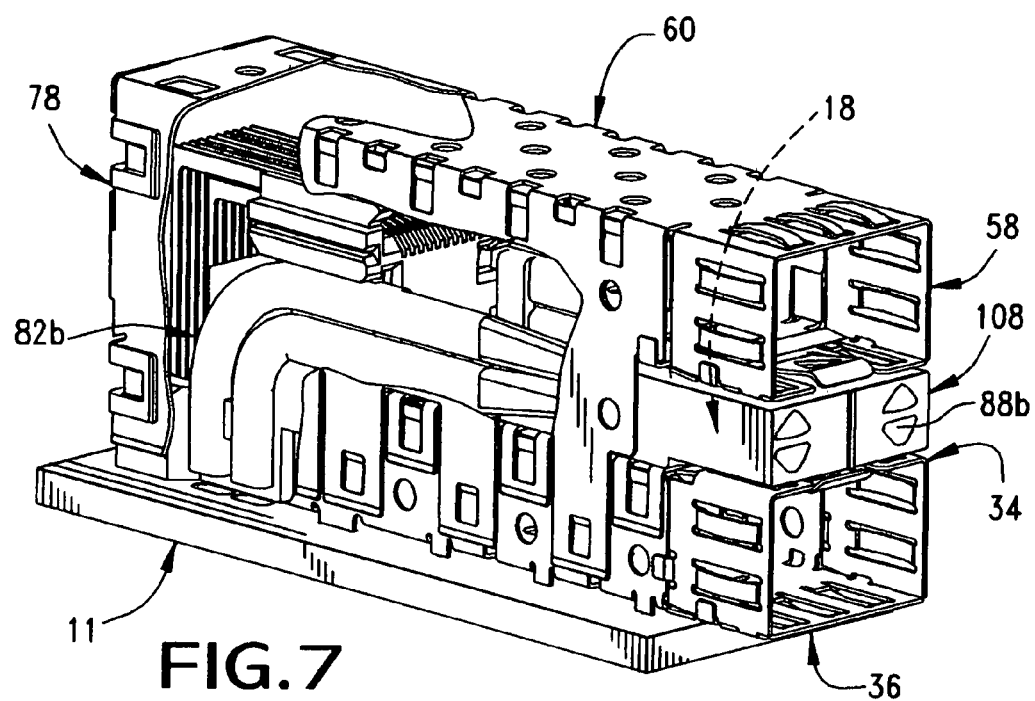
FIG. 7 is a partial cutaway perspective view showing the light pipe assembly of FIG. 5 incorporated into the connector assembly, and specifically disposed within the exterior shield assembly and partially within the space dividing the two module-receiving bays of the connector assembly.

Referring to FIGS. 5 and 7, it may be desired to arrange output faces 88*b* of light pipes 84*b* in a "side-to-side" configuration with respect to the connector assembly mating direction. Thus, the configuration of light pipes 84*b* must transition from the "over-and-under" orientation of horizontal portions 100*b* to the "side-to-side" configuration. This transition is shown best in FIG. 5. The transition in the configuration of the light pipes between right angle bends 98*b* and output ends 88*b* is achieved by forming, in transition region 102*b*, angled portions 104*b* in each of the body portions of the light pipes. The transition region 102*b* preferably resides within housing cavity 18.

FIG. 5 shows one possible arrangement of angled portions 104*b* in transition region 102*b*. At points on the light pipe body portions 90*b* which are located within the housing cavity 18, the body portion 90*b* of the bottommost light pipe 84*b* angles inward and upward, while the body portion 90*b* of the top most light pipe 84*b* angles outward and downward. The straight sections 106*b* of the body portions 90*b* then proceed from angled portions 104*b* toward a front portion of connector assembly 10 proximate the connector receiving openings in cage assemblies 104*b*. As seen in FIG. 5, the body portions 90*b* may be angled such that straight sections 106*b* are spaced apart from each other and spaced approximately the same distance from printed circuit board 11.

A support member 92*b* may be positioned between body straight sections 106*b* proximate angled 104*b* to position and secure the light pipe straight sections 106*b* with respect to each other and with respect to connector housing 12. The width of support member 106*b* may be set to provide and maintain a desired predetermined spacing between straight sections 106*b*. Also, the length of support member 92*b* may be set to provide a press fit between upper cage base component 58 and lower cage cover component 34 when light pipe assembly 82*b* is inserted into the cavity 18 formed between the upper port 16 and lower port 14 of the connector housing. The support member 92*b* may also be plated with a metallic material to form a conductive member extending between upper cage assembly base component 58 and lower cage assembly cover component 34. This provides additional grounding contact between cage assemblies 28 and 30.

Figure 8:
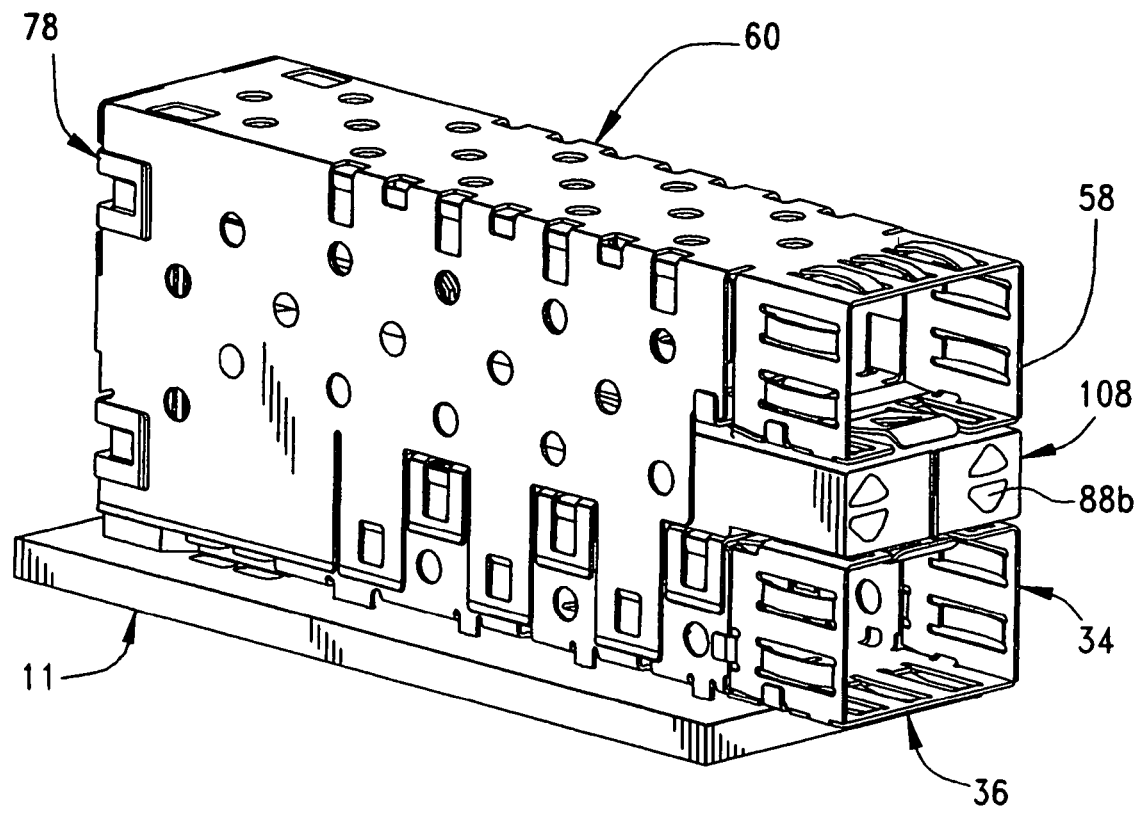
FIG. 8 is the same view of the connector assembly of FIG. 7, but with the shield assembly exterior wall shown in place.

FIGS. 7 and 8 show that portions of light pipe straight sections 106*b* that include output faces 88*b* may be received in a shroud, or endcap 108. The end cap 108 may be preferably formed using conductive materials to provide some degree of EM shielding. The endcap 108 secures the light pipe output faces 88b in a pattern, and provides additional EMI shielding for the overall connector assembly. For these purposes, the end cap 108 may be disposed to create intimate contact with both the upper cage assembly 58 and the lower cage assembly 36 and may be connected to a grounding member on the printed circuit board 11.

In FIGS. 7 and 8, two light pipe assemblies 82b are embodied in two pairs of spaced apart light pipes 84b extending along opposite sides of connector housing 12. In this embodiment, the light pipe assemblies 82b reside within housing recesses 20, within upper cage cover component 60, and within the cavity 18 formed between upper port 16 and lower port 14. As such, the light pipe assembly 82b resides within the existing printed circuit board "footprint" of the connector assembly as defined by connector housing 12 and the cage assemblies that enclose the housing. Thus, this embodiment of the connector assembly incorporates a light pipe assembly therein without occupying additional space on printed circuit board 11.

Assembly of the connector assembly 10 of FIGS. 1, 2 and 6 will now be described. In a first step, the terminals may be press-fit into connector housing 12. Terminal tail portions 22 are then inserted into tail aligner holes 26 and the tail aligner 24 is secured to connector housing 12, thereby securing tail portions 22 with respect to housing 12. The upper and lower cage assemblies 58, 36 are then secured over the connector housing 20 to upper and lower housing ports 14 and 16, respectively.

The rear wall 78 of the cage assembly is then attached to the shielding cage assembly over the upper and lower assemblies 30, 28 and the upper cover component 60 to enclose terminal tail portions 22, tail aligner 24 and to close off the rear portion of connector housing 12. The rear wall 78 is generally secured in intimate contact with one or more walls of each of upper cage assembly base component 58, upper cage assembly cover component 60, lower cage assembly base component 32 and lower cage assembly cover component 34. As stated previously, mounting pin portions 80 may also be formed on the shielding cage rear wall 78 in a desired pattern to engage and mate with corresponding mounting holes on the circuit board 11. These holes may be plated through holes which are electrically coupled to circuit traces on printed circuit board 11. These circuit traces are connected to one or more grounding features, thereby providing a grounding path for electromagnetic energy flowing through cage assemblies 28 and 30. After securing rear wall 78 to upper and lower cage assemblies 28 and 30, the connector assembly 10 may be electrically attached as a single unit to the printed circuit board 11.

Assembly of the second embodiment of connector assembly 12 will now be described with reference to FIGS. 1, 2, 7 and 8. In a first step, the terminals are press-fit into connector housing 12. Terminal tail portions 22 are then inserted into tail aligner holes 26 and tail aligner 24 is secured to connector housing 12, thereby securing tail portions 22 with respect to housing 12. In this embodiment, the lower cage assembly 28 is then secured to the connector lower housing port 14, and the base portion 58 of the upper cage assembly 30 is then attached to the connector upper housing port 16. The light pipe assembly 82b is then press-fit into housing recess 20 and the housing cavity 18. Upper cage assembly cover component 60 is then attached to upper cage assembly base component 60, thereby enclosing light pipe assembly 82b within side walls of upper cover component 60. The spacing between the upper and lower cage assemblies 30, 28 defines a cavity that extends lengthwise of the connector assembly and this cavity accommodates the horizontal extent of the light pipe assemblies.

Figure 9:
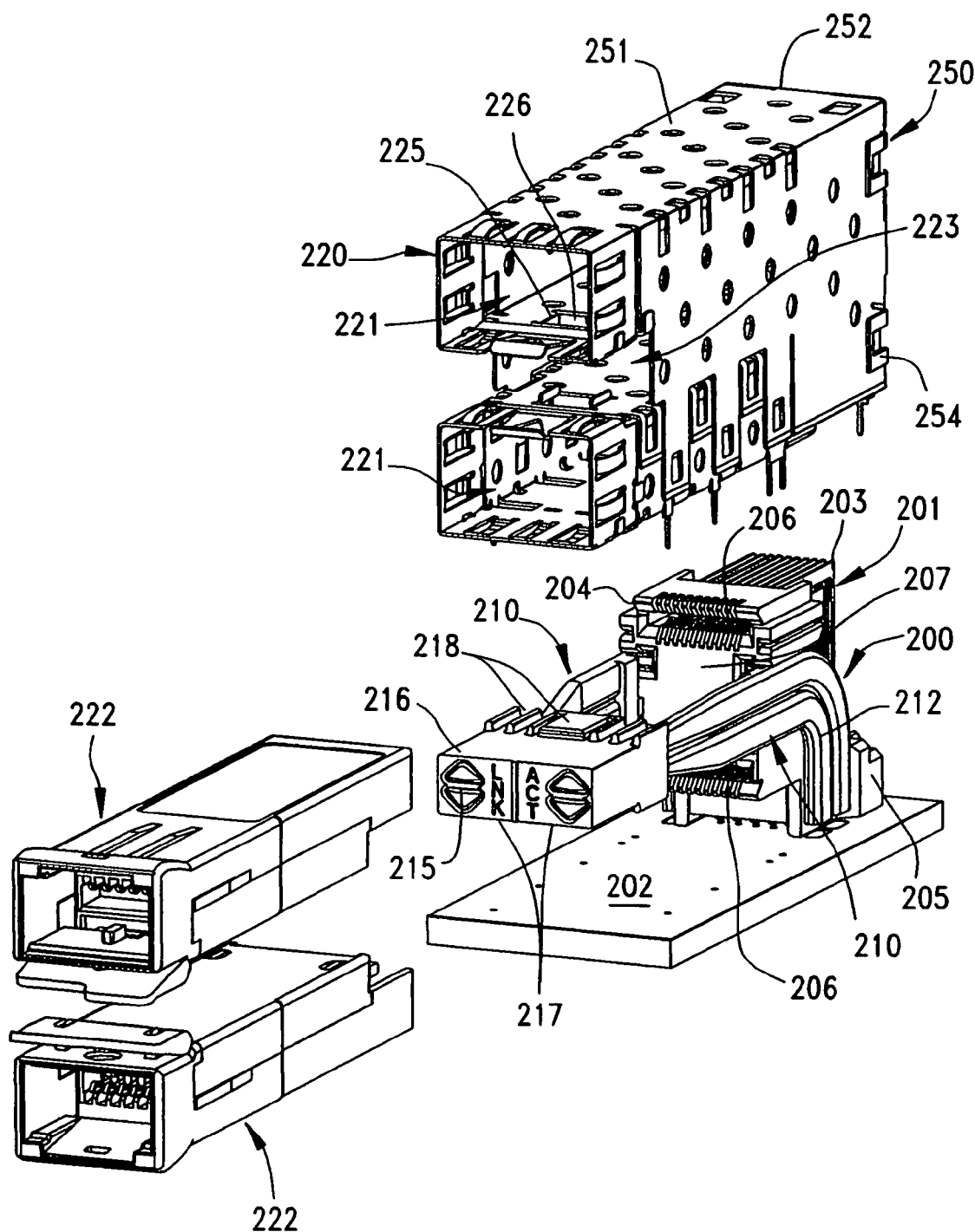
FIG. 9 is an exploded view of a third embodiment of the invention wherein the light pipes engage the connector component of the assembly by way of slots disposed in the front face of the connector components, and which are partially contained within the space separating the two module-receiving bays of the connector assembly.

The rear wall 78 may then attached to cage assemblies 28, 30 to enclose terminal tail portions, tail aligner 24 and the rear portion of connector housing 12 as described above. After securing rear wall 78 to upper and lower cage assemblies 30 and 28, connector assembly 10 may be electrically attached to printed circuit board 11. FIG. 9 illustrates a different connector 201 that supports a plurality of conductive terminals 203, each terminal of which may be stitched into rear openings 204 disposed in an insulative housing 205 of the connector 201. The connector 201 is shown in its eventual mounting location on the circuit board 202 and the connector housing 205 illustrates in this embodiment includes a pair of card edge connector portions 206 which are disposed in a "stacked", or vertically spaced-apart, fashion along the front face 207 of the connector housing 205. The stacked connectors 201 are enclosed within a metal shielding cage assembly 220 that has two module-receiving bays 221 defined therein. Each of these bays 221 is intended to receive an electronic module 222 therein in a fashion that is well known in the art. The module-receiving bays 221 are also stacked or spaced-apart vertically from each other and, due to the cage construction, an intervening space 223 that extends lengthwise through the shielding assembly 220 is defined between the two bays 221.

Figure 10:
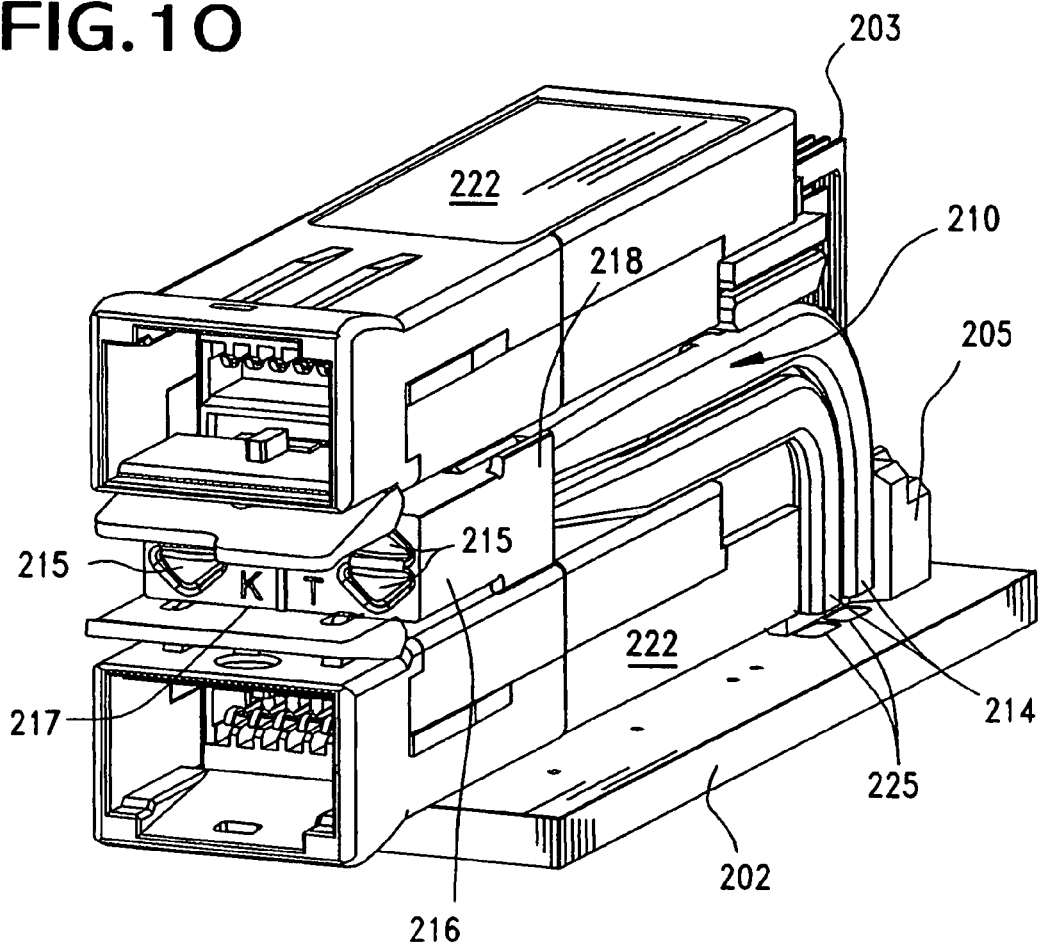
FIG. 10 is the same view as FIG. 9, but with the modules shown in engagement with their associated connector component and with the shielding cage assembly removed for clarity.
Figure 14:
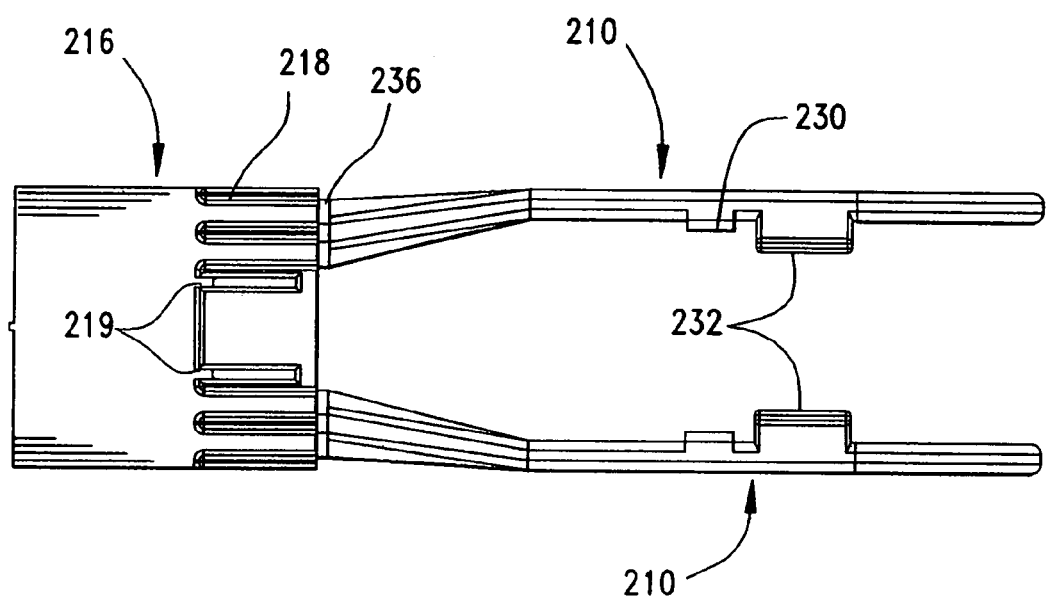
FIG. 14 is a top plan view of the light pipe and end cap assembly of FIG. 11, taken along line 14-14 thereof.

The light pipe assembly 200 includes two pairs 210 of light pipes 212 that extend forwardly of the connector 201 along the sides of the connector housing 205 and into the intervening space 223 between the two bays. The light pipes 212 are generally L-shaped and have first ends 214 (FIG. 10) that are positioned in opposition to illuminators 225 located on the circuit board 202. The second ends 215 of the light pipes are located on the opposite ends of the light pipes 212 and as illustrated, are preferably held in place and in a selected alignment by an end cap 216, which typically would be formed of a conductive material. This is so that the endcap 216 may provide a means of electrically connecting the two module-receiving bays of the shielding assembly together as well as providing a measure of electromagnetic interference shielding across the intervening space in which it resides. The exterior shielding cage assembly includes a rear wall 250 that may be formed as a separate piece or may be formed as part of the top cage assembly. In the former instance, the rear wall 250 is separately attached to the cage assembly and in the latter instance, it is preferably folded down over the back opening of the cage assembly and then attached to the upper cover 251. Instances where the rear wall 250 is formed as part of the upper cover 251, it is attached thereto along and end 252 and then folded back over the rear opening. In either instance, the rear wall 250 is preferably secured by integrated clips 254 or pins or the like.

Figure 11:
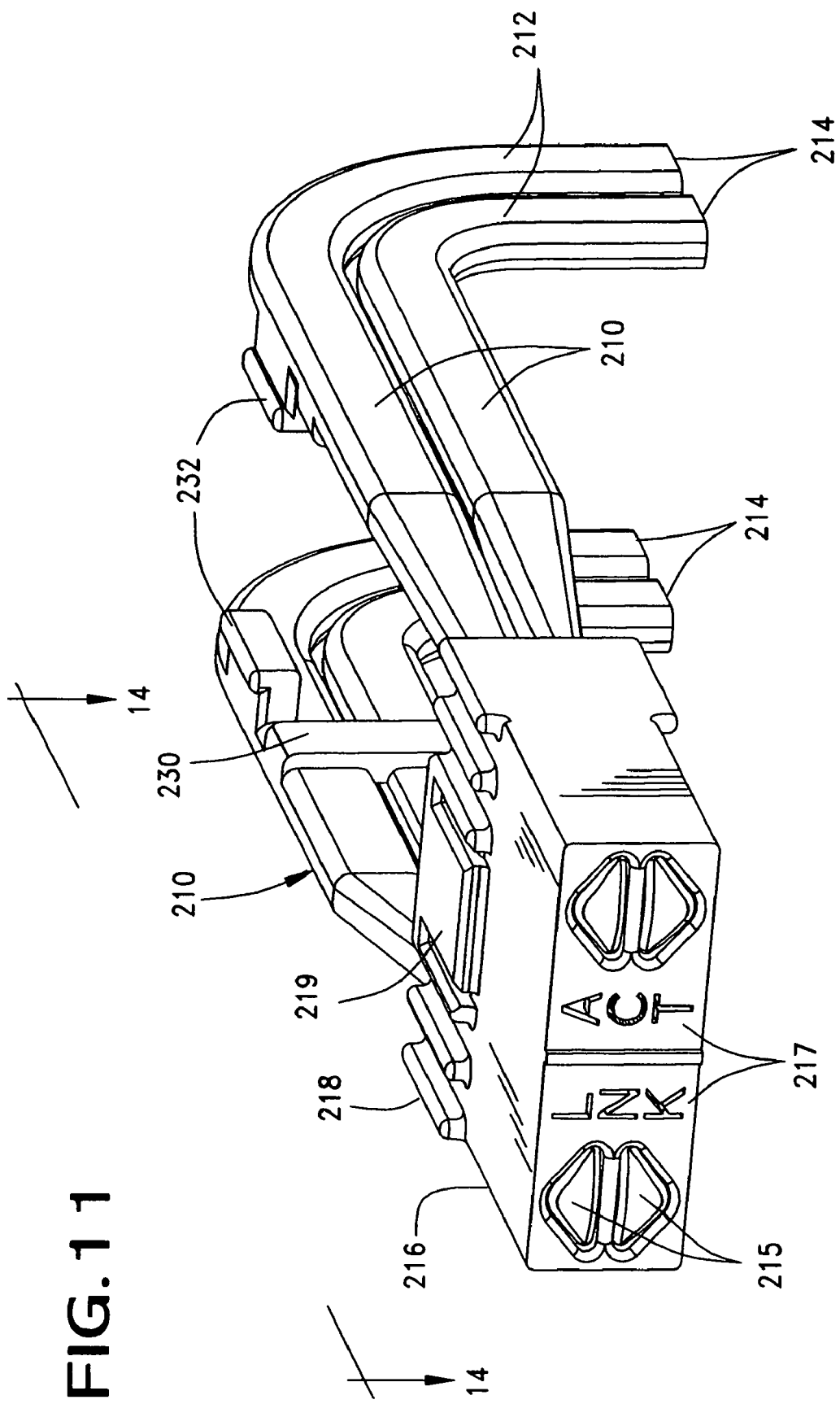
FIG. 11 is a perspective view of only the light pipe assembly of FIG. 9.
Figure 12:
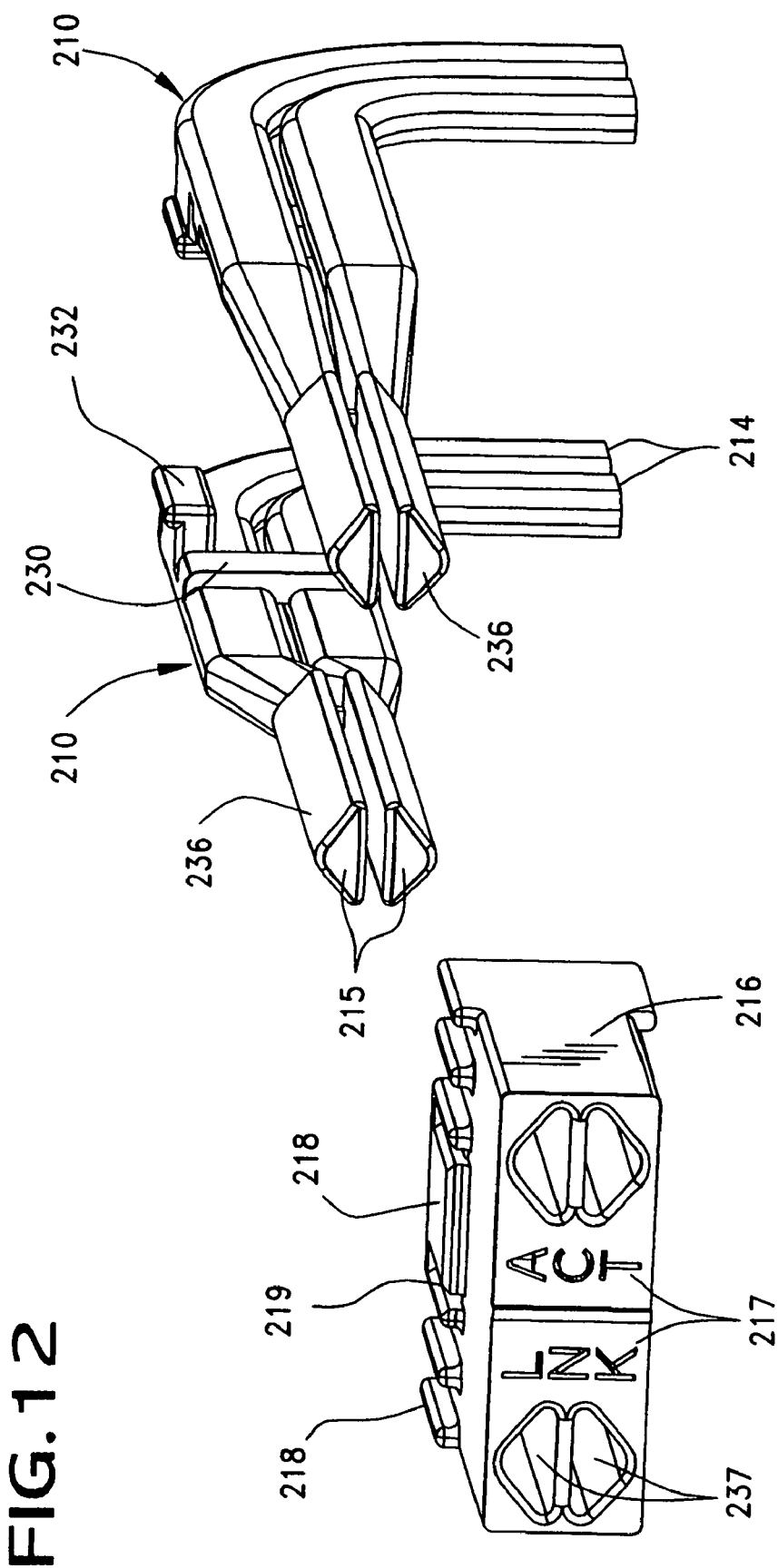
FIG. 12 is the same view as FIG. 11, but with the light pipe end cap shown exploded away from the light pipes for clarity.
Figure 16:
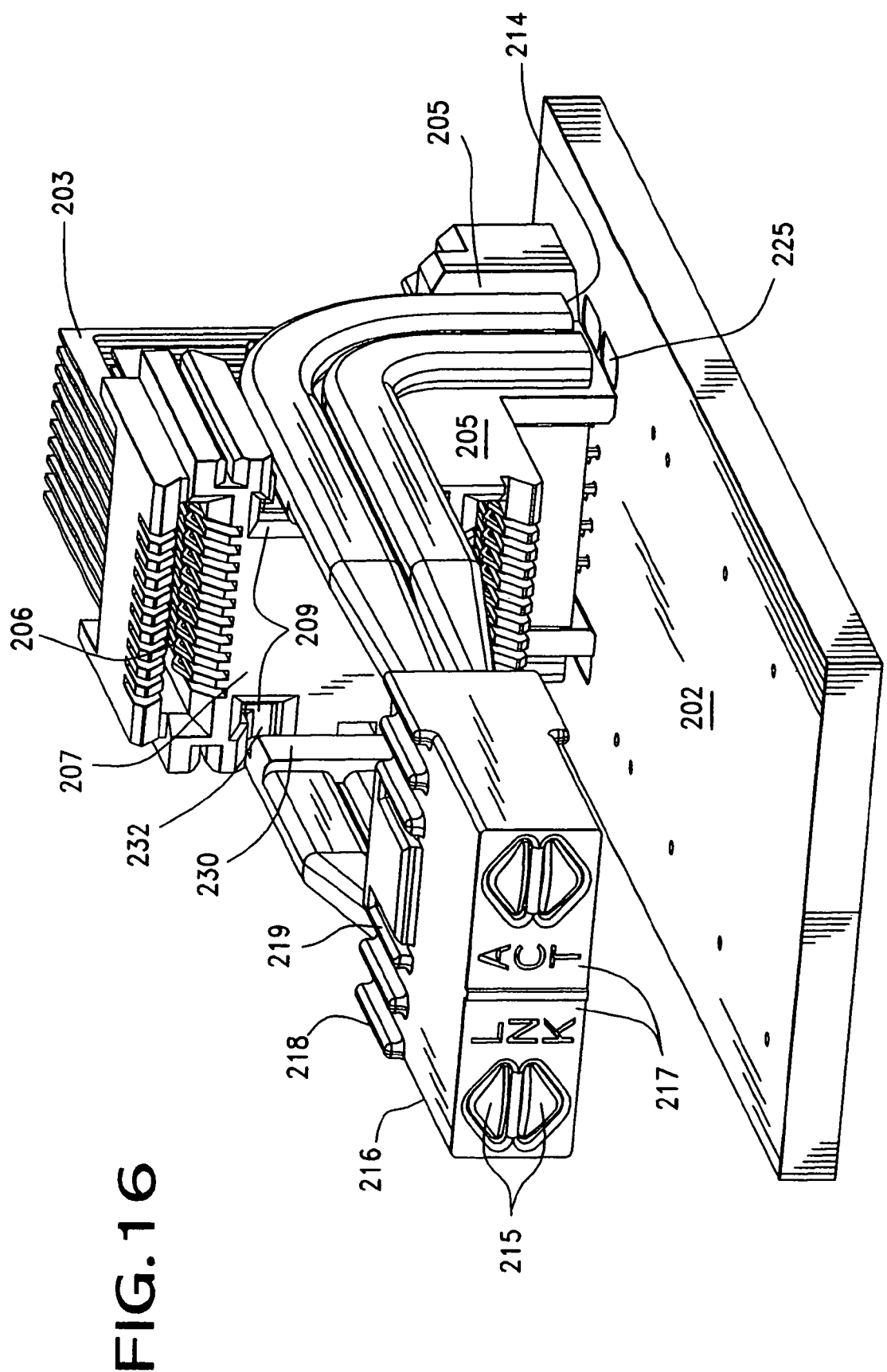
FIG. 16 is an enlarged detail perspective view of FIG. 9, illustrating only the light pipe and end cap assembly engaged with their associated connector component and positioned in place on a circuit board.

The end cap 216 is received within (as are the horizontal portions of the light pipes 215) the intervening space 223 that separates the two bays 221. The end cap 216 may include indicia 217 that identify the function of the connector 200, i.e., whether the modules are connected to the connector or whether the modules are energized or the like. As shown best in FIG. 11, the end cap 216 may include a plurality of engagement members, shown as raised members 218 that engage opposing elements formed on the top bay 221 of the shielding assembly 220. Slots 219 may be formed in the members 218 to receive members 225 formed in the top bay 221. (FIG. 9.) Similarly, the square, raised member 218 may be received in a like-sized opening 226 that is disposed in the upper cage assembly 220. Each pair 210 of light pipes may further include a support bar 230, shown vertically, that may be integrally formed with the pair 210 of pipes in order to space the pipes of each pair 210 apart a selected distance. In order to engage the connector and to partially support the pipes in their extent, the pairs of light pipes may further each preferably include engagement members 232, shown as hook-type lugs that extend inwardly of the pipe pairs 210. As shown best in FIG. 16, these lugs 232 are received within cavities, or slots 209 that are formed in the front face of the connector housing 205. As shown in the Figures, the lugs 232 are L-shaped, but any configuration that holds the pipes in place will suffice.

Figure 13:
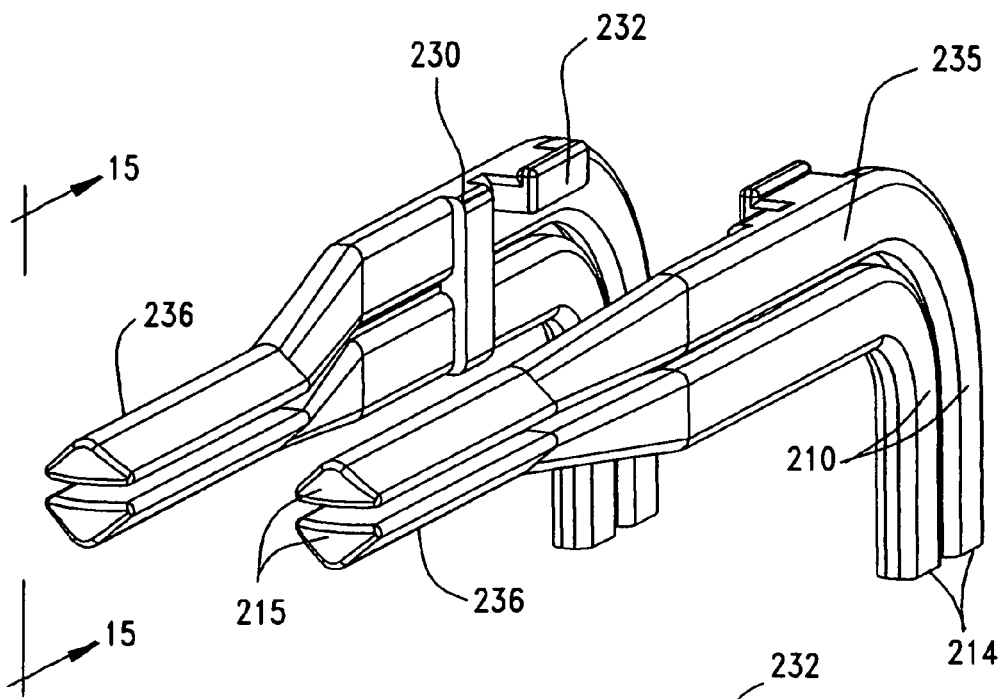
FIG. 13 is a perspective view of only the two pairs of light pipes of FIG. 12.
Figure 15:
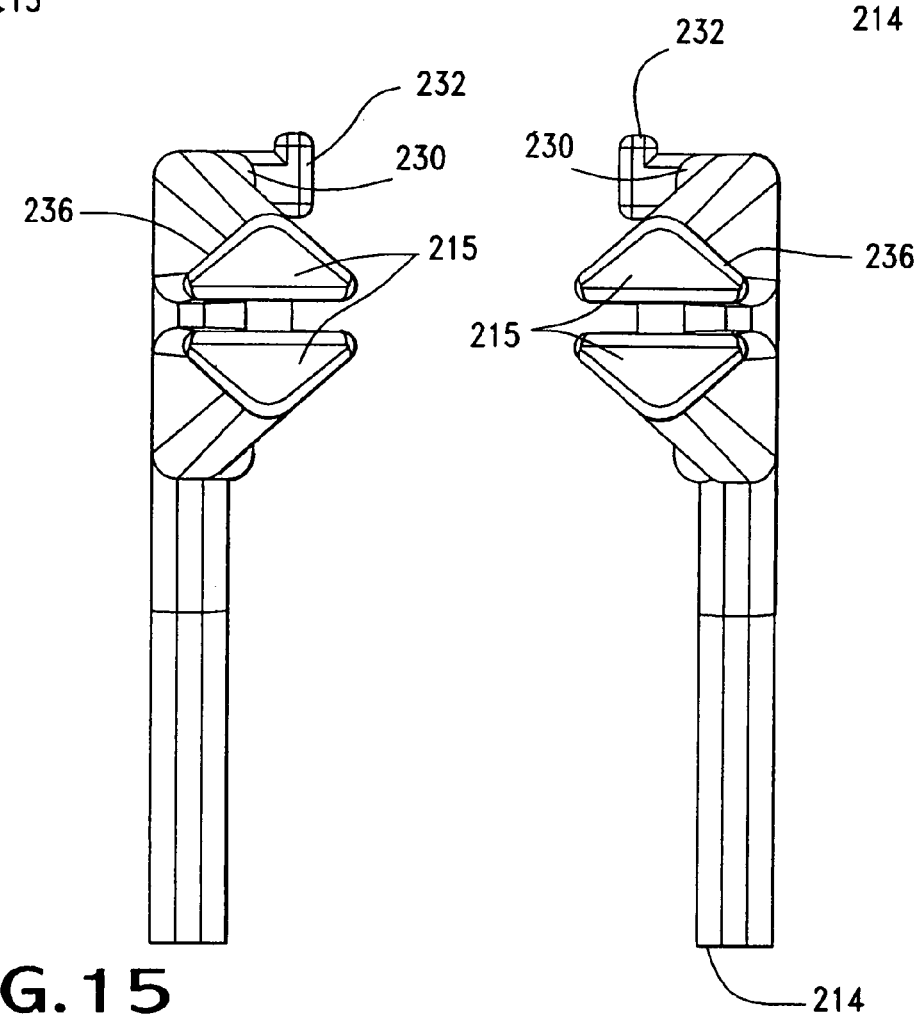
FIG. 15 is a frontal elevational view of the light pipes of FIG. 13, taken along line 15-15 thereof.
Figure 17A:
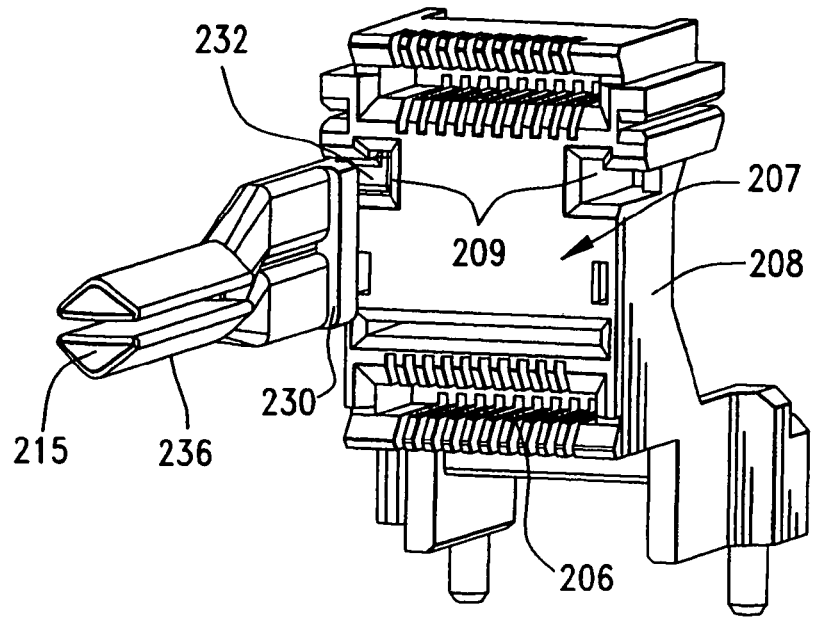
FIG. 17A is a perspective view illustrating the right-side light pipe in engagement with the connector component of FIG. 16.
Figure 17B:
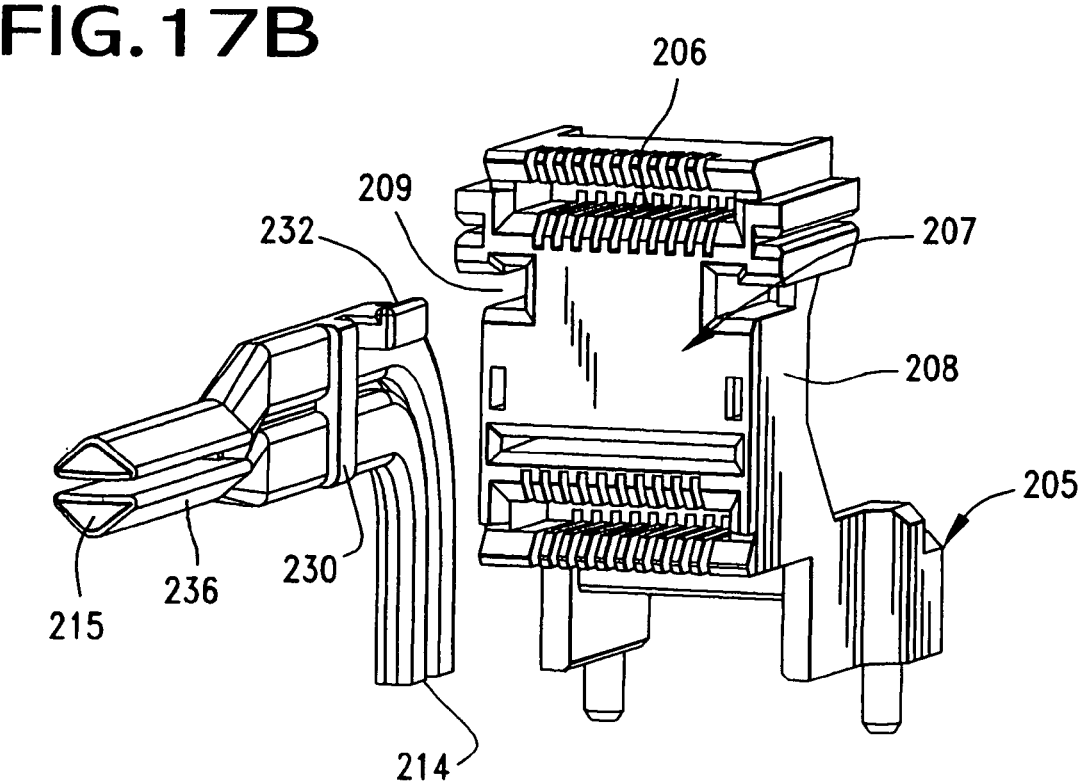
FIG. 17B is the same view as FIG. 17A, but with the light pipe removed from engagement with the connector component to illustrate better the manner of engagement between the two components.

As shown best in FIG. 13, the light pipes may have thick body portions 235 that reduce down in thickness to thin second end portions 236. These end portions 236 are received within complimentary openings 237 formed in the end caps 216 and which extend lengthwise through the end cap 216. In this regard, the end cap 216 may keep the pipes together in a selected alignment along their lengthwise extent through the intervening space 223 between the two module-receiving bays 221 of the shielding assembly 220. As shown best in FIGS. 17A & 17B, the connector housing 205 has recesses 208 formed along the sidewalls of the connector housing 205, and the recesses are shown as positioned generally on the connector housing 205 at a level midway of the height of the connector housing 205, but the recesses may be located elsewhere.

Figure 18:
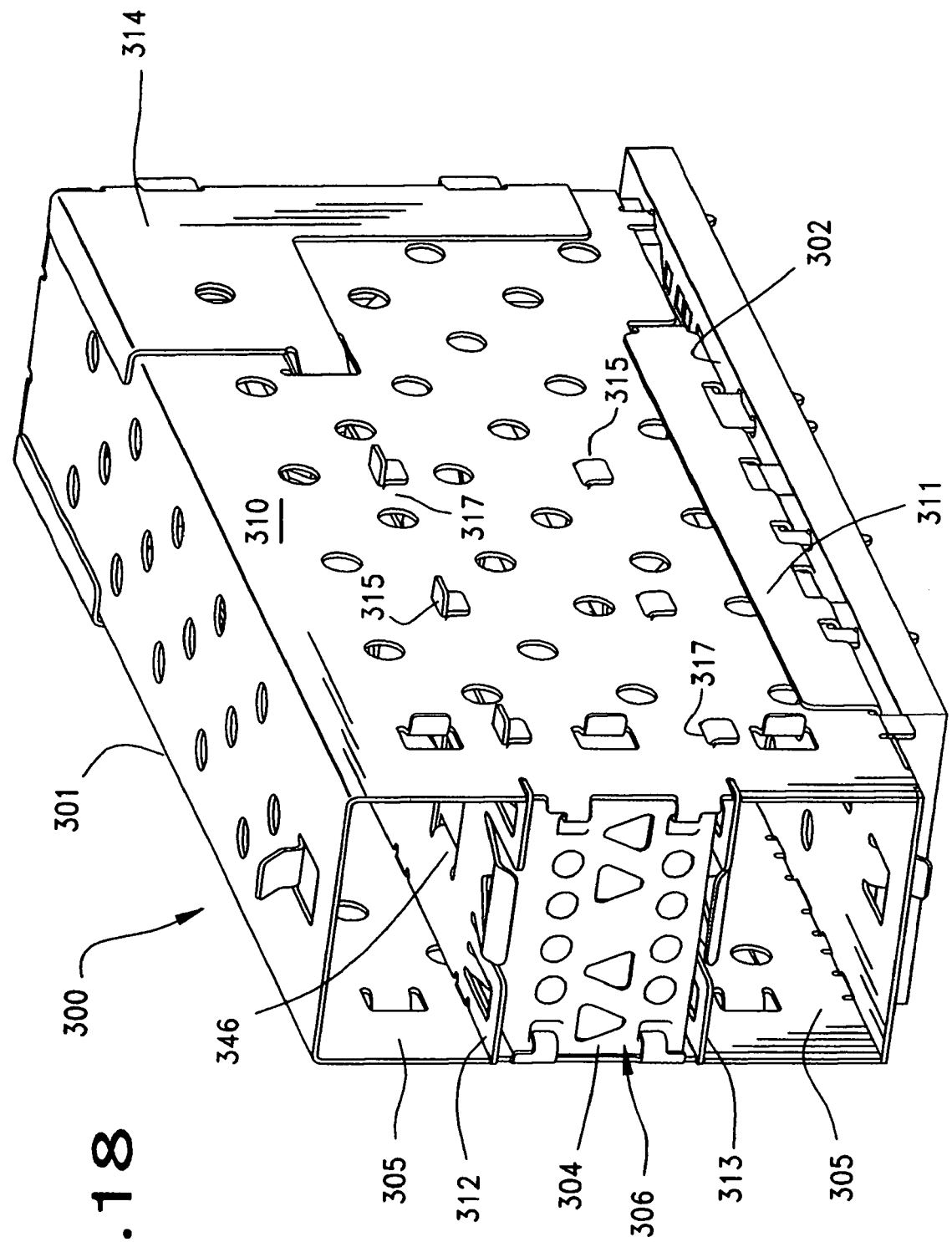
FIG. 18 is a perspective view of a small from factor connector assembly utilizing another, or fourth, embodiment of a light pipe assembly constructed in accordance with the principles of the present invention.

FIG. 18 illustrates another connector assembly that incorporates light pipes constructed in accordance with the principles of the present invention. In FIG. 18, only the shield assembly 301 is illustrated along with the circuit board 302 and the light pipe end cap 304. In assembly, the shield assembly 301 receives the connector housing 205 from the rear opening and then the rear wall member 314 is applied to the shield assembly 301 so as to form an integrated assembly that is applied to the circuit board 302 as a single element, rather than applied over a discrete connector applied to the circuit board. The shield assembly 301 is configured to define a pair of module-receiving bays 305 that are spaced apart from each other in the vertical direction so as to be considered stacked upon each other. The bays 305 are separated by an intervening space 306 that is shown occupied by the end cap 304 and through which the light pipes extend. The shielding assembly 301 is shown as including a hollow enclosure 310 that has a bottom wall 311, intervening walls 312, 313 and a rear wall 314 that closes off the enclosure after the connector and light pipe assemblies have been inserted as a unit from the rear of the shielding assembly 301. The intervening walls 312, 313 have tabs 315 that extend into and preferably through openings 317 that are formed in the side walls of the enclosure 310.

Figure 19:
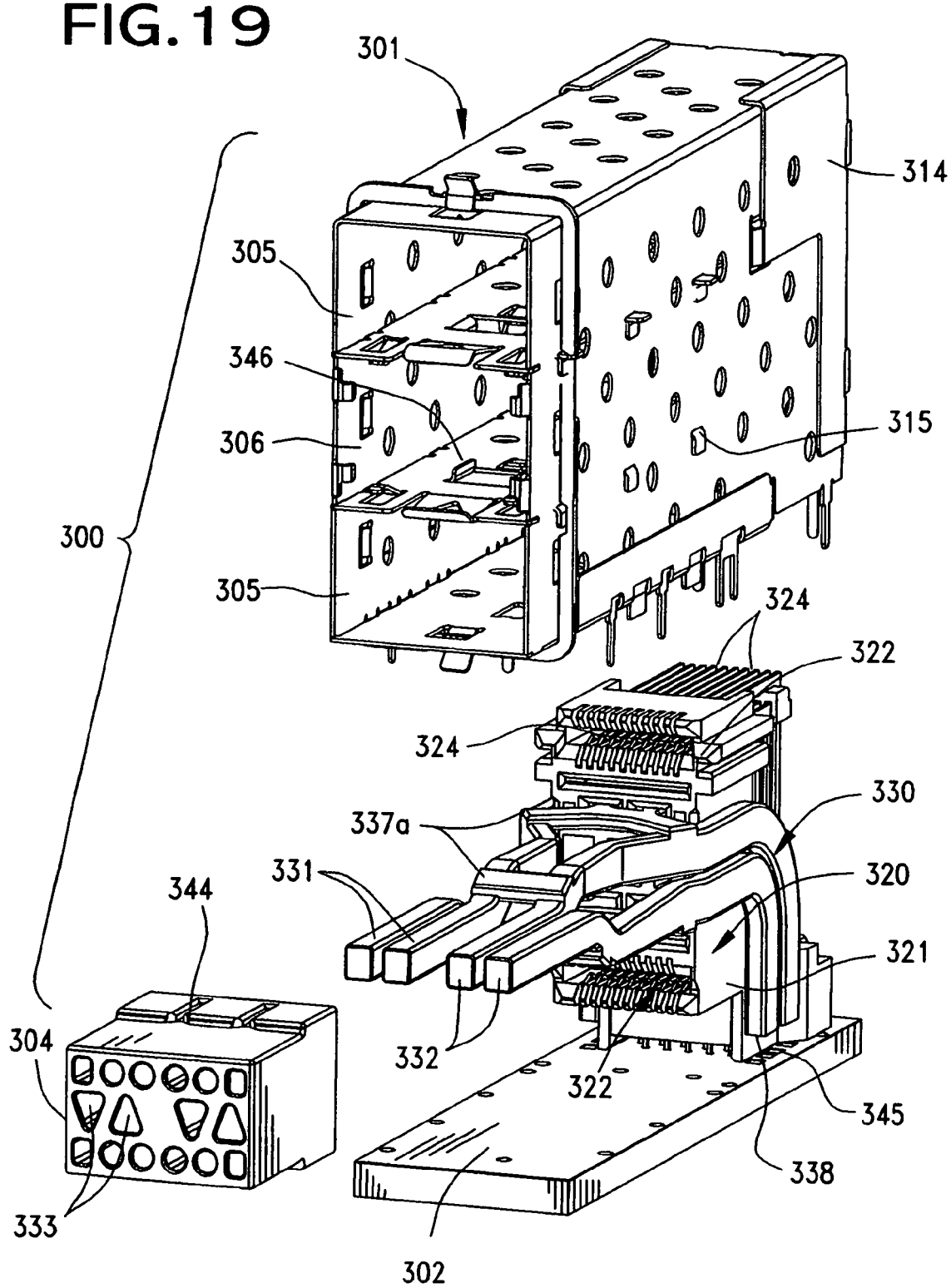
FIG. 19 is a perspective view, partially exploded, of the connector assembly of FIG. 18.

In FIG. 19, the shielding assembly 301 is removed from the circuit board 302 for clarity in order to expose the internal connector 320 and the light pipe assembly 330 to view. The connector component 320 includes an insulative housing 321 with two edge card-receiving slots 322 spaced vertically apart from each other so that each slot 322 is aligned with one of the two module-receiving bays 305. The connector housing 321 includes a plurality of cavities, each of which receives a single conductive terminal 324 therein. As is known in the art, each terminal may include a contact portion that is exposed within the card slots 322. A light pipe assembly 330 is shown with two pairs of light pipes 331 which are separated from each other horizontally. These pipes have indicator ends 332 received within an end cap 304, which includes openings 333 which communicate to the pipe indicator ends 332.

Figure 21:
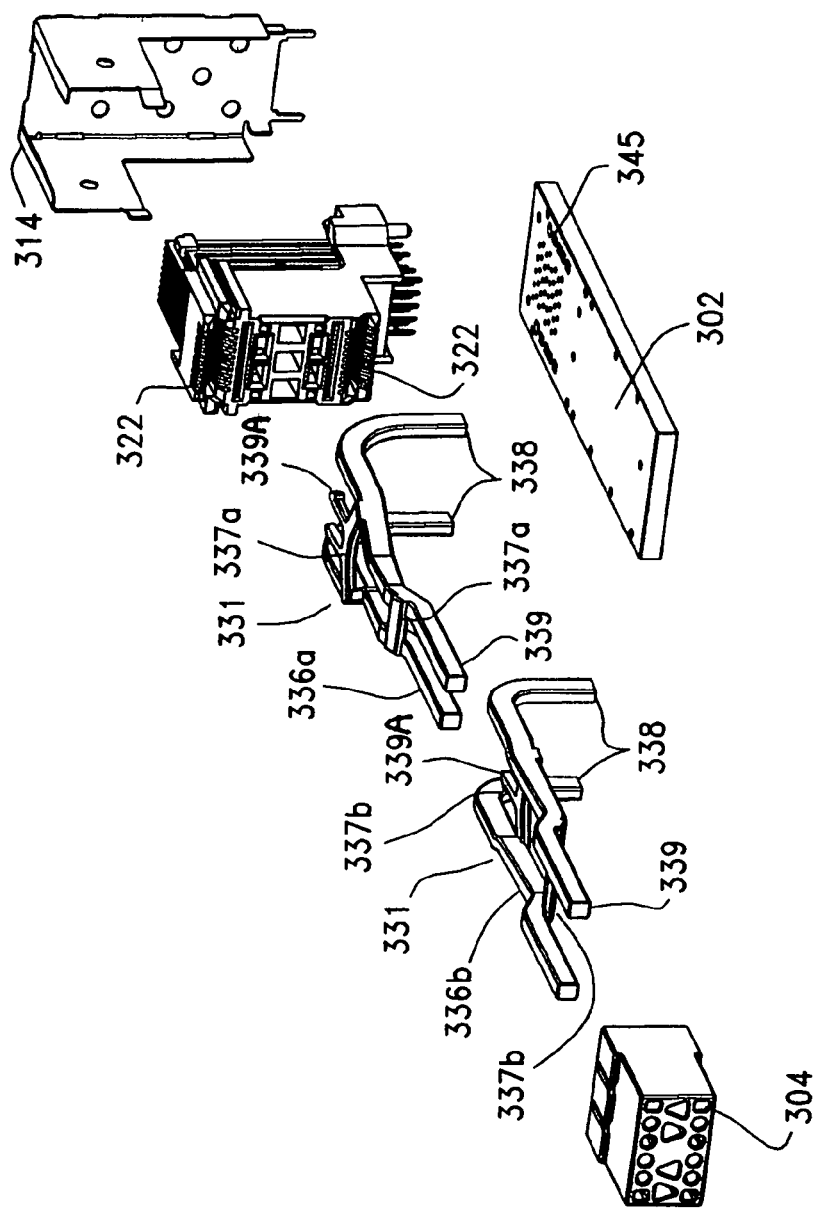
FIG. 21 is the same view as FIG. 20, but fully exploded to illustrate all of the components of the overall assembly in which the present invention is used.
Figure 22:
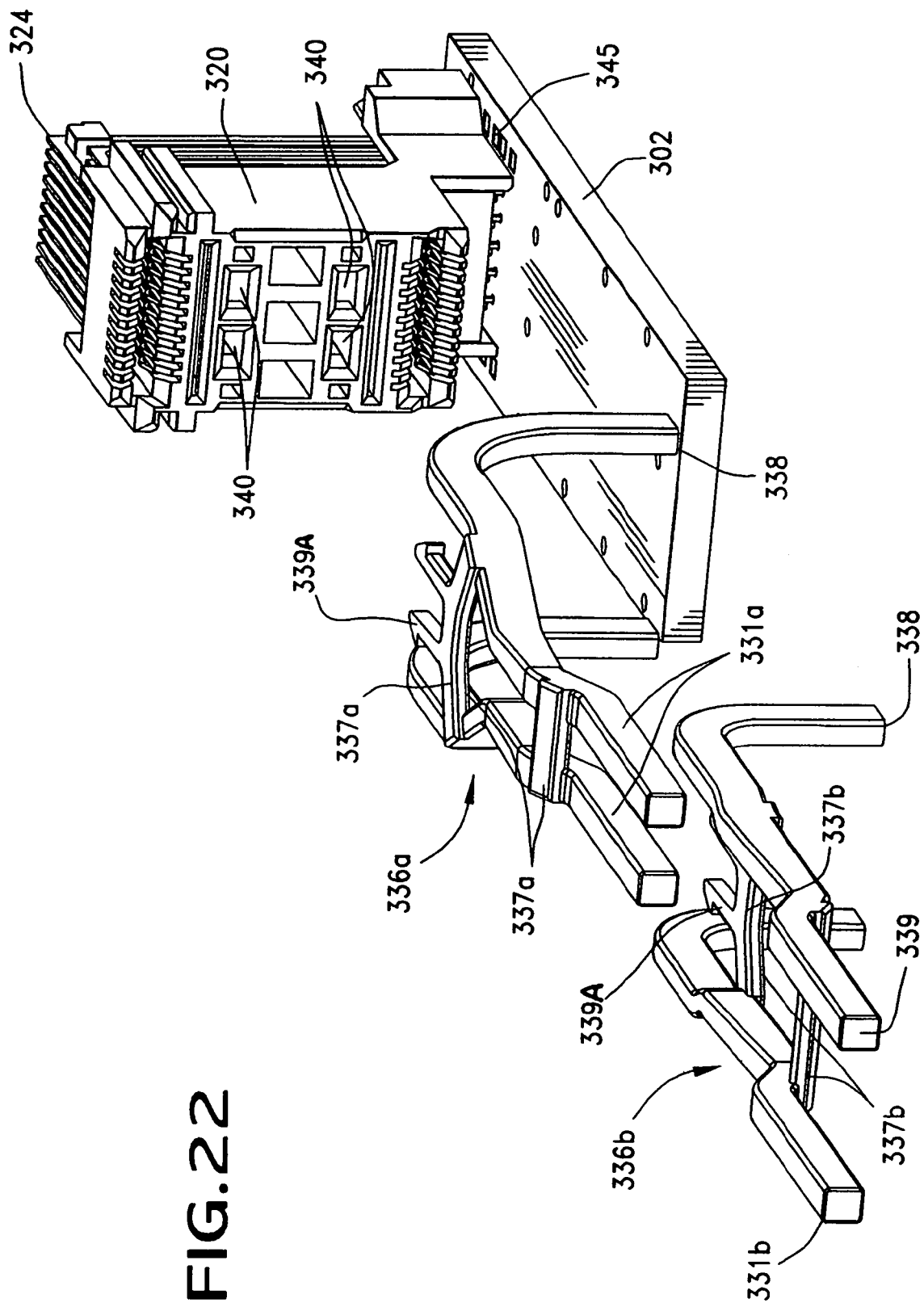
FIG. 22 is a perspective view illustrating the light pipes spaced apart from their associated connector component.

As shown best in FIG. 21, the light pipe assembly 330 preferably includes two distinct elements, which may be referred to as first and second arrays 336a, 336b of light pipes. Each such array 336a, 336b includes two light pipes 331 that are spaced apart from each other. The spacing between the two pipes is closer in the first array 336a than it is the second array 336b. (FIG. 22.) In this manner the light pipes 331 of the first array 336a may be received within the space between the two pipes 331 of the second light pipe array 336b. In such a fashion, the first array 336a may be considered as at least partially "nested" within the second array 336a.

Figure 23A:
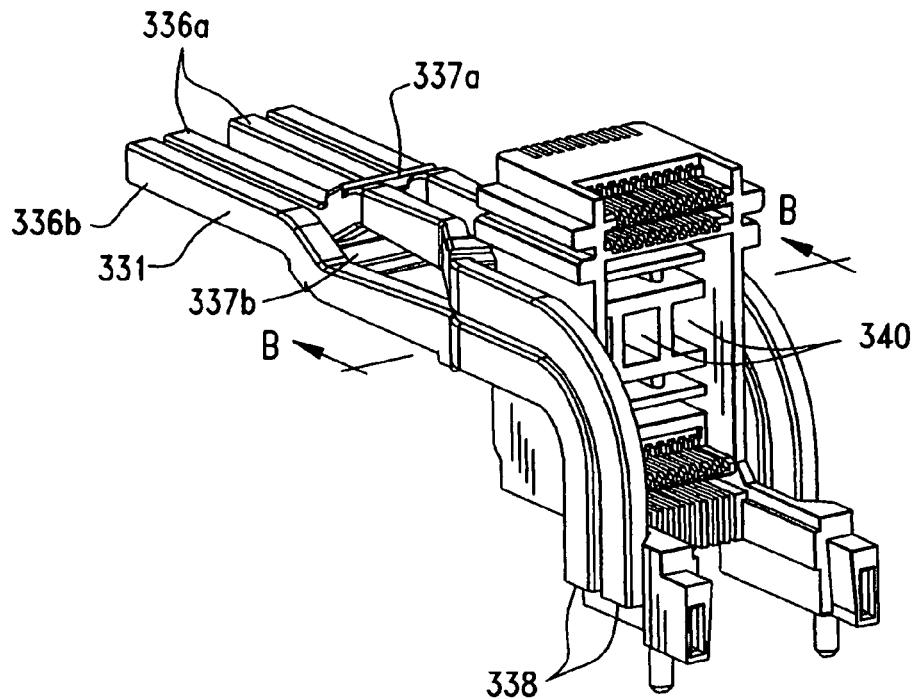
FIG. 23A is a perspective view of the light pipe-connector component assembly, and taken from the rear thereof to illustrate the manner in which the light pipes extend along the sides of the connector component to face the circuit board illuminators.
Figure 26A:
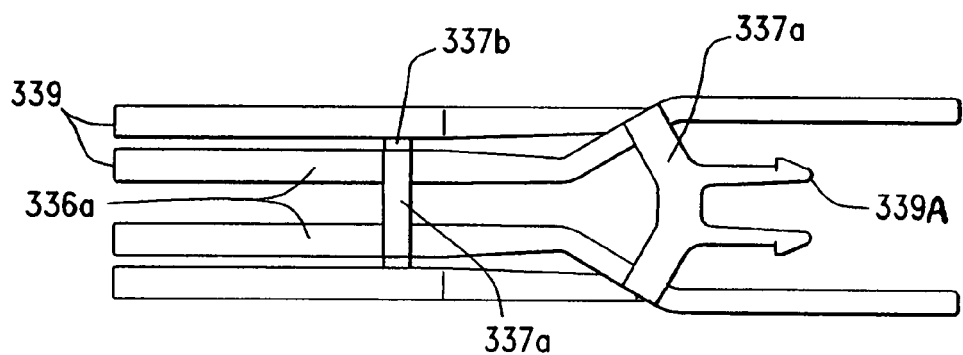
FIG. 26A is a top plan view of the first and second pairs of light pipes nested together.
Figure 26B:
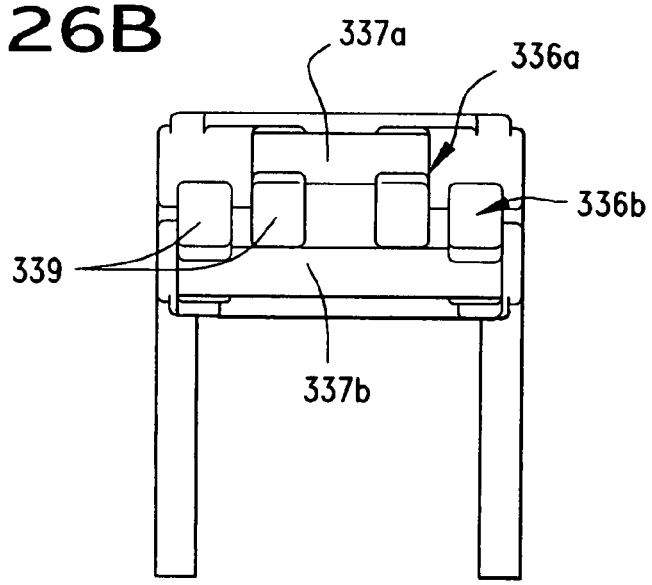
FIG. 26B is a front elevational view of FIG. 26A, showing the two pairs of light pipes in line together.

Similar to the other embodiments, the two light pipes 331 of each array 336a, 336b are held together in their spacing by a support or tie bar 337a, 337b which extends horizontally somewhat above the light pipes 331 of the first array 336a and somewhat underneath the light pipes 331 of the second array 336b. The light pipes are generally L-shaped and have opposing ends 338, 339, with one end 338 being positioned over or on a illuminator device 345 disposed in the circuit board 302 near the sides of the connector 320. With the support bars 337a, 337b of the light pipe arrays 336a,b being inverted, it is possible to place the first array 336a of pipes on and within the second array 336b of pipes. The support bars 337b of the second light pipe array 336b in effect, define a "nest" into which the horizontal extent of the first light pipe array 336a are received. This nesting is shown best in FIGS. 23A, 26A & 26B.

Figure 20:
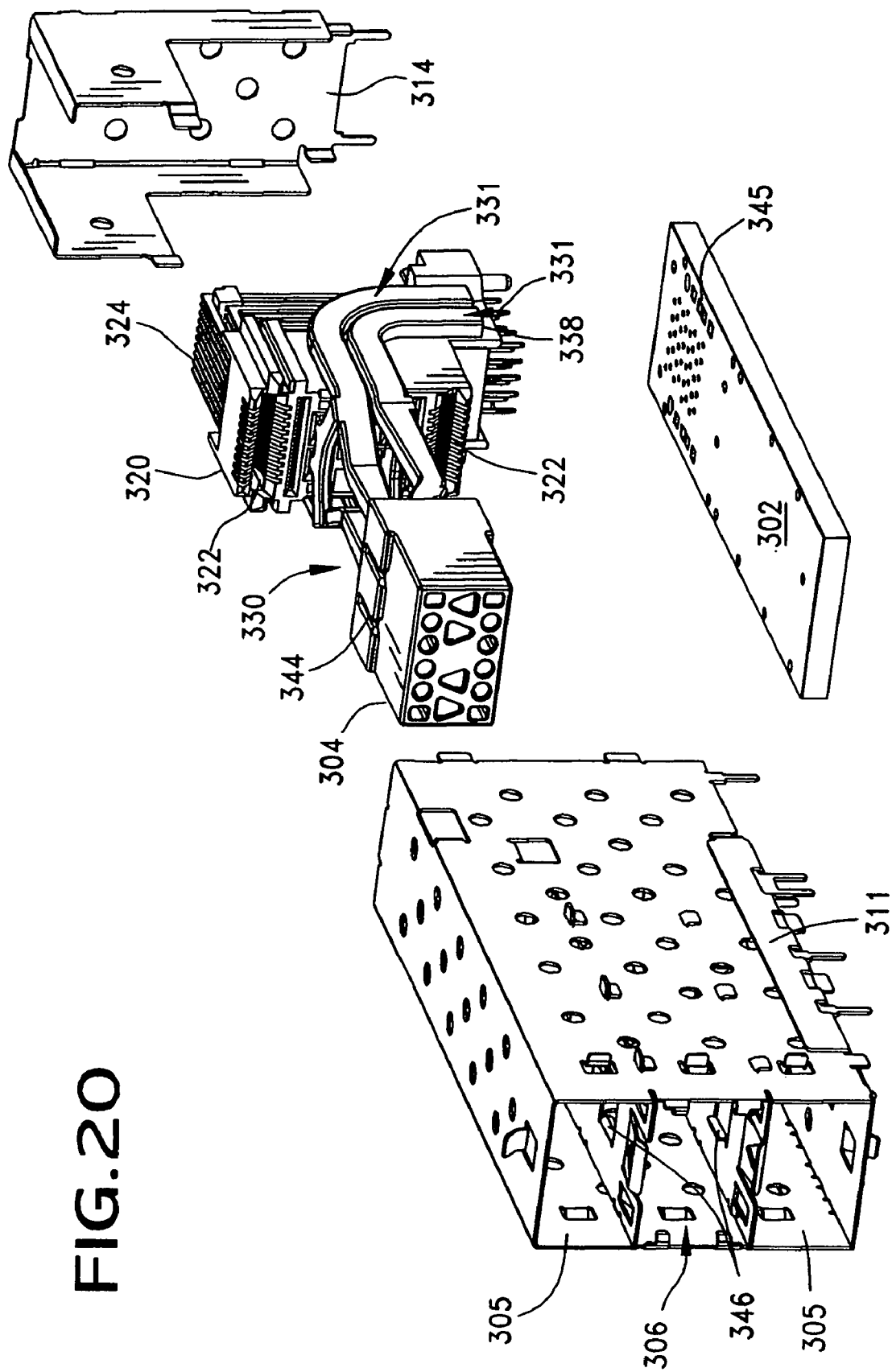
FIG. 20 is the same view as FIG. 19, but with the light pipe and connector assembly shown separated from the circuit board and the shield rear end removed to illustrate the manner of insertion of the light pipe-connector assembly into the shielding cage.
Figure 23B:
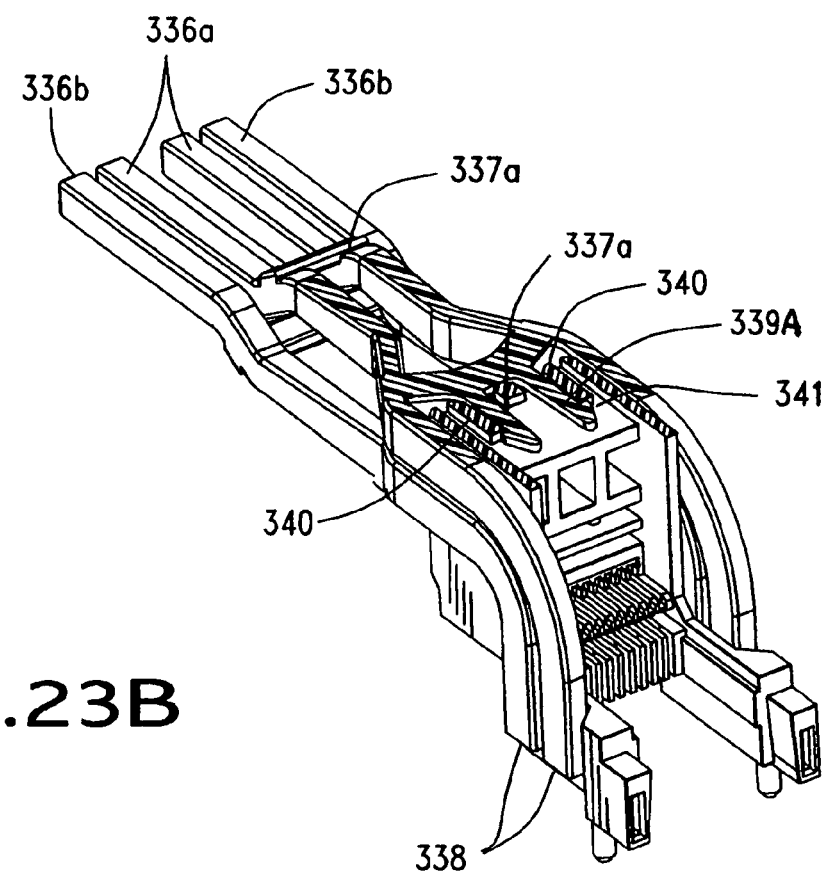
FIG. 23B is the same view as FIG. 23A, but sectioned along line B-B thereof.
Figure 25B:
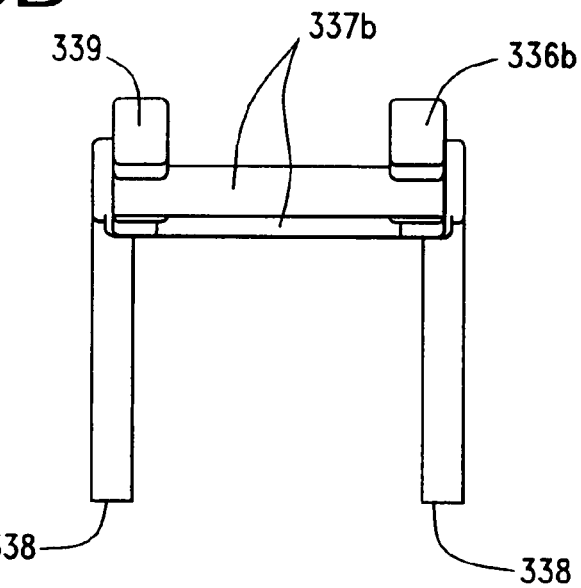
FIG. 25B is a front elevational view of FIG. 25A, showing the outer pair of light pipes.

The rearmost support bars 337a, 337b of each of the light pipe arrays 336a, b include means for engaging the connector 320 and such means are illustrated as pairs of engagement hooks 339 that extend rearwardly from their support bars 337a, 337b. These hooks 339A are received within recesses 340 that are formed in the connector housing 321 and which, as shown best in FIG. 23B, include shoulder portions 341 which the engagement hooks 339A engage. The engagement hooks 339A of the first array 336a are received in the top row of recesses 340 as shown in the sectional view of FIG. 23B, and the engagement hooks 339 of the second array 336b are received within the bottom row of recesses 340. (FIG. 20.)

The offset nature of the support bars 337, 338a,b also facilitates the fitting of the light pipes into the intervening space 306 between the top and bottom bays 305 by reducing the overall height of the horizontal extent of the light pipe arrays 336a,b. The end cap 304 may include slots 344 that are formed on the top and bottom surfaces thereof receive stubs 346 formed on the intervening walls of the shielding assembly 301.

Figure 27:
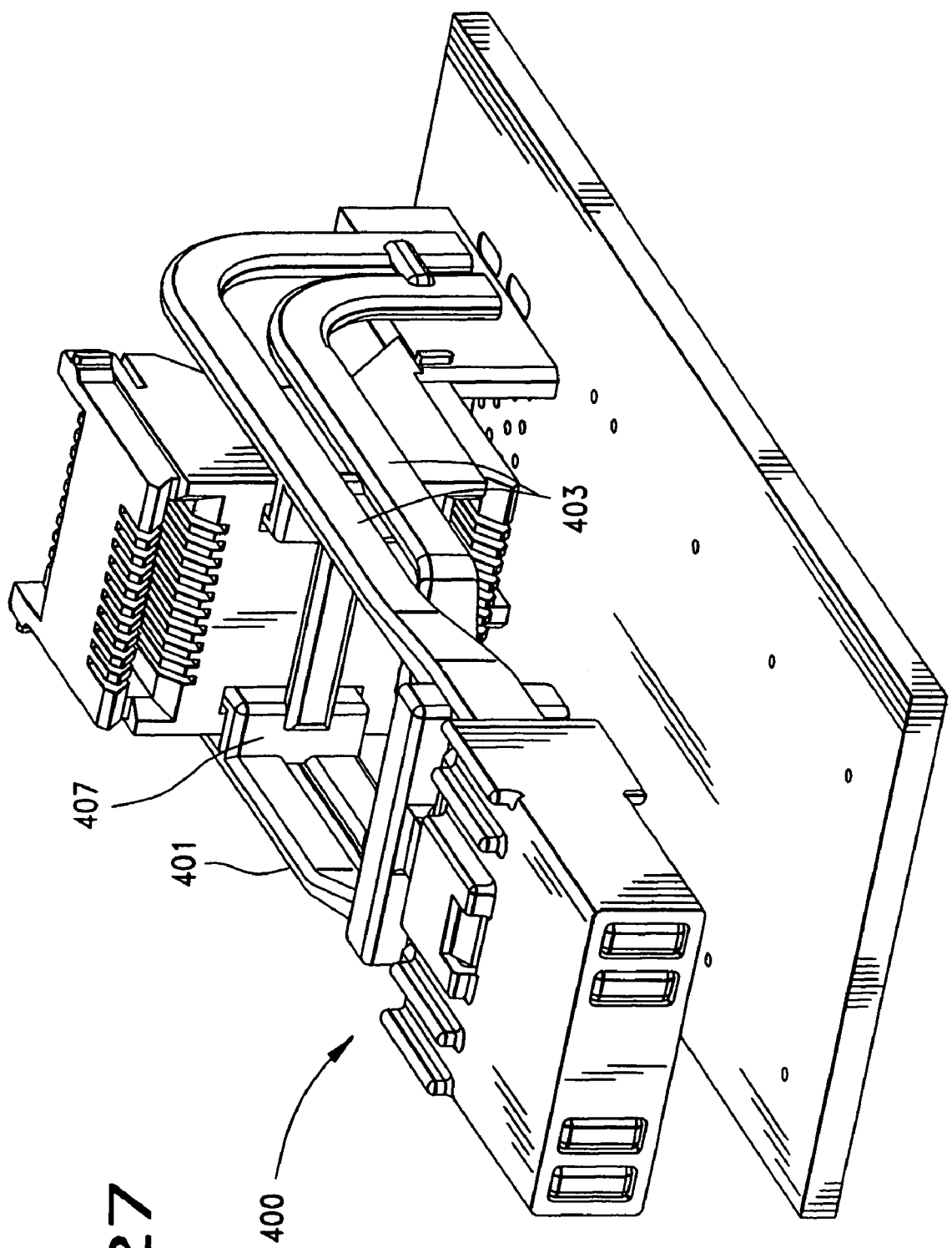
FIG. 27 is a perspective view of another alternate embodiment of a light pipe, endcap and connector assembly.
Figure 28:
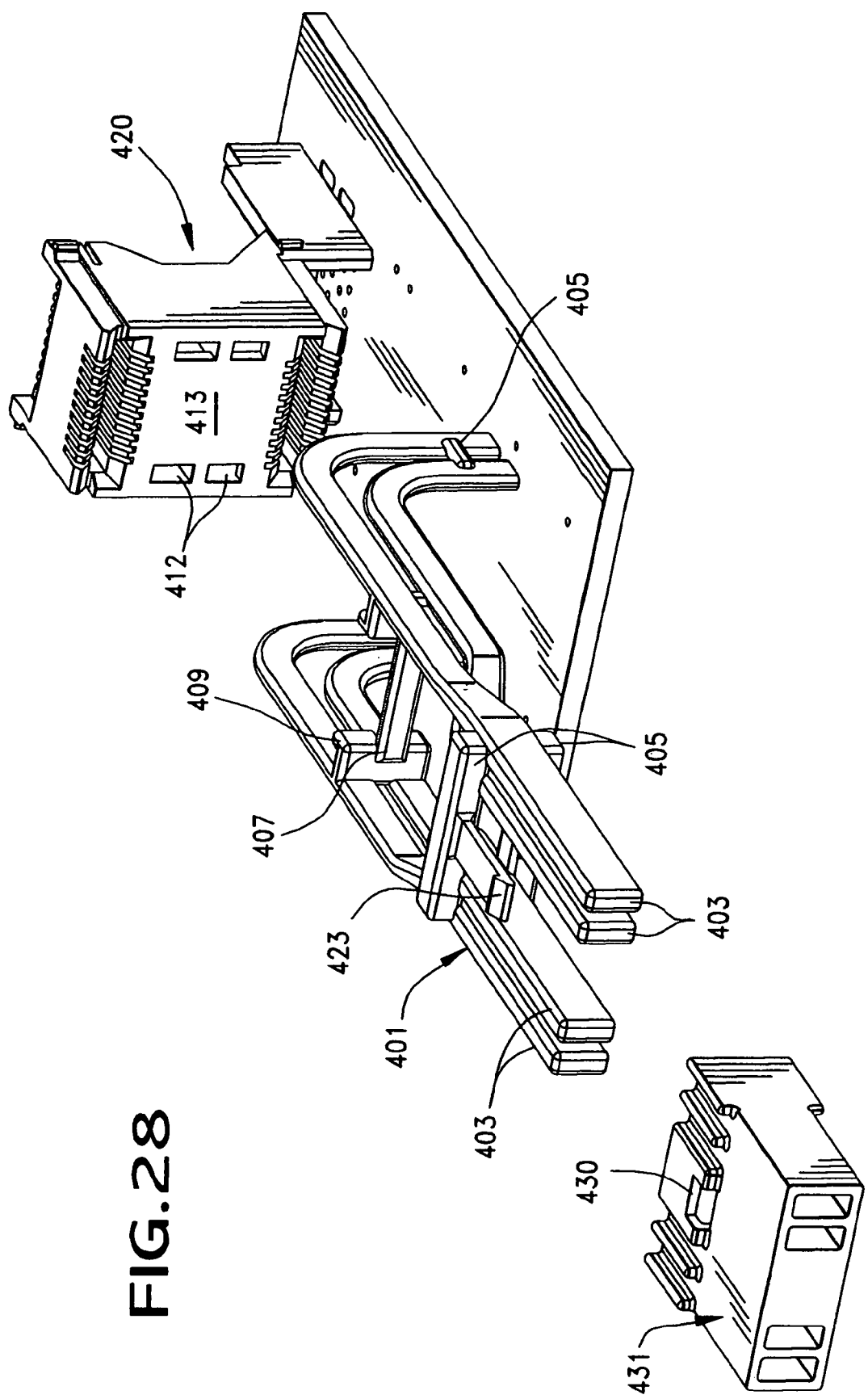
FIG. 28 is an exploded view of FIG. 27.

FIGS. 27 and 28 illustrate an embodiment 400 in which the light pipe assembly 401 is integrally formed as a single piece, such as by injection molding or any suitable process. In FIG. 28 the light pipe assembly 401 has two pairs of light pipes 403 associated which are interconnected together by support members 405 to form a lattice-like structure. The support members 405 are shown interconnecting together both the vertical and horizontal portions of the light pipes. Another set of support members 407 may interconnect the horizontal portions and may include engagement members 409 formed therewith, which are received within corresponding openings 412 disposed in the front face 413 of the associated connector component 420. The forwardmost support member 405 may also include an engagement member, shown as a hook member 423 that engages the shoulder 430 of an end cap 431. Once again in this embodiment, the light pipe assembly 401 is supported entirely along the front face 413 of the connector 420 and not by any side portions thereof, which assists in reducing the overall width of the connector assembly and exterior shielding assembly (not shown).

Figure 29:
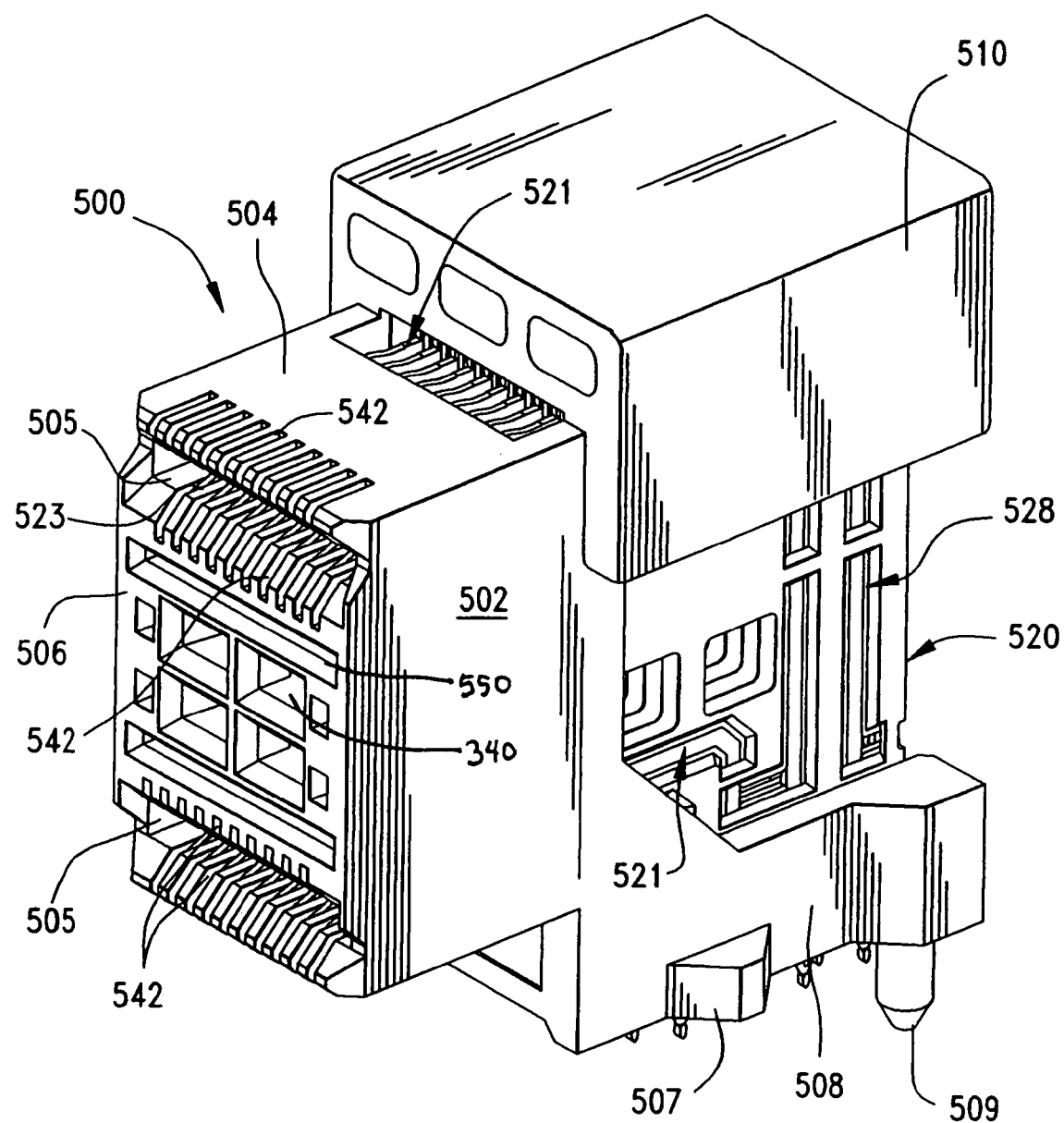
FIG. 29 is a perspective view of a small form factor connector constructed in accordance with the principles of the present invention and which utilizes individual terminal assemblies.
Figure 30:
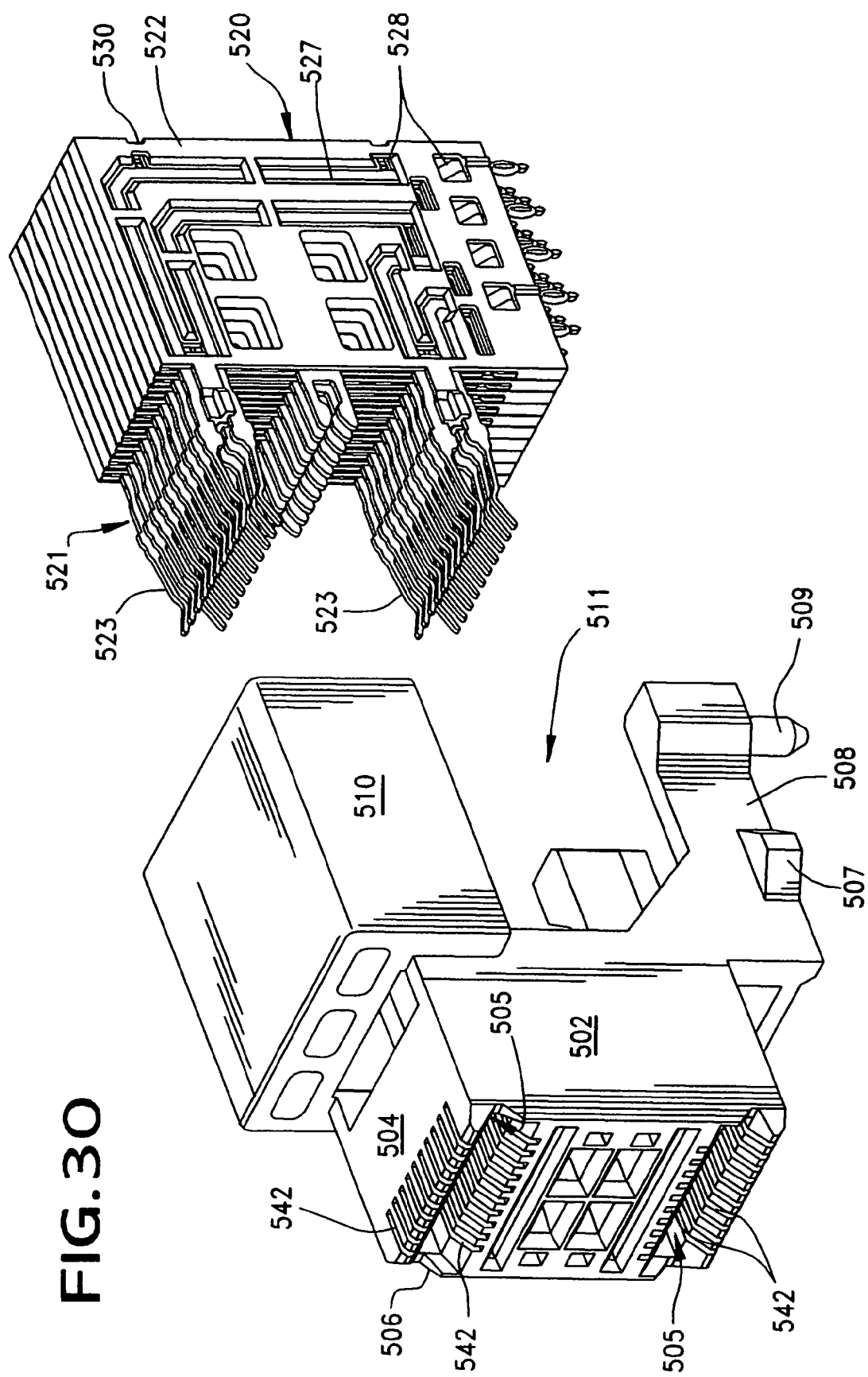
FIG. 30 is an exploded view of FIG. 30, illustrating the terminal assemblies removed from their position within the connector housing.
Figure 31:
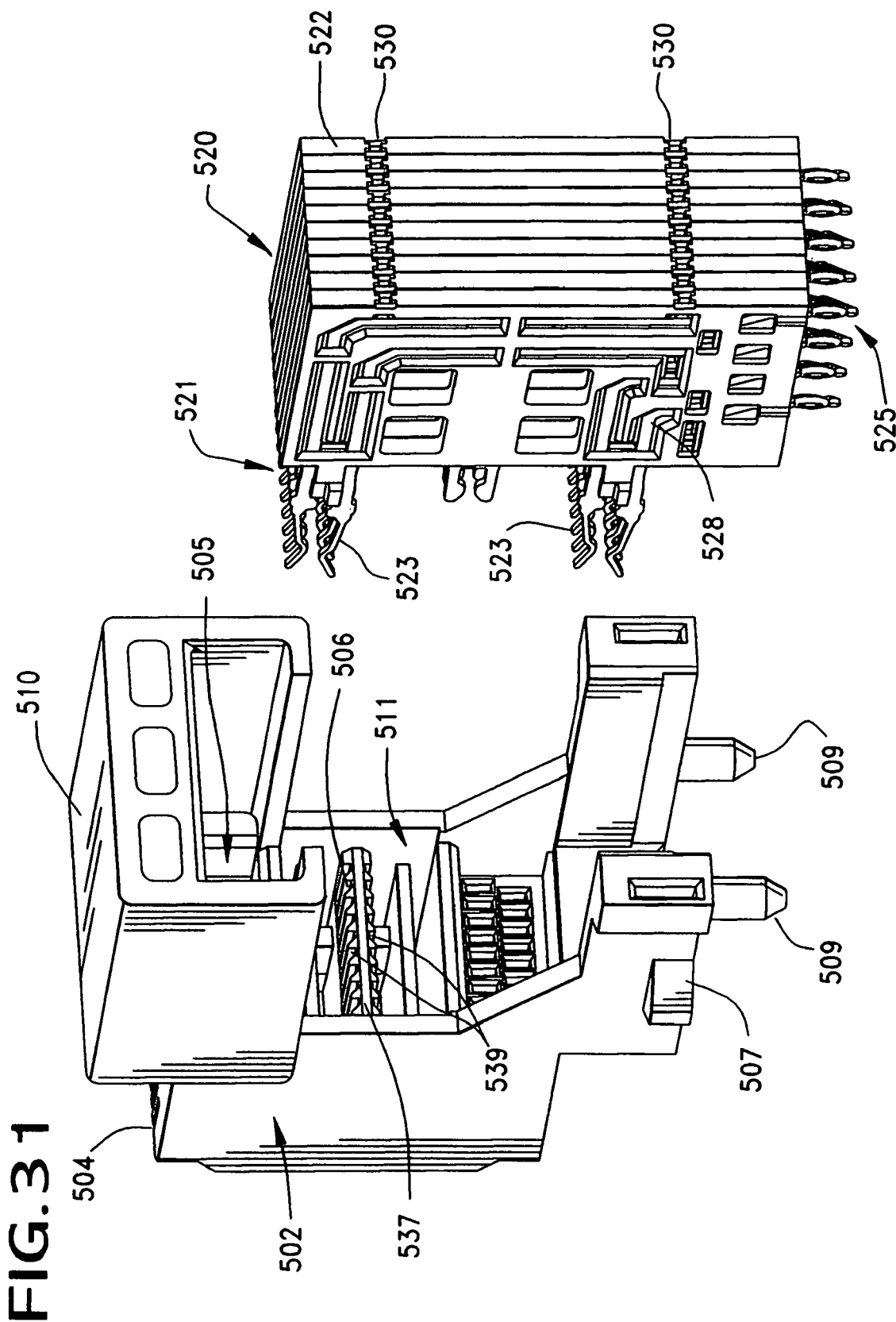
FIG. 31 is the same view as FIG. 29, but taken from the rear, illustrating the internal structure of the connector cavity, including the terminal-receiving slots of the connector housing and the terminal assembly engagement ledge of the connector housing.

FIG. 29 illustrates a connector 500 suitable for use in small form factor applications and particularly with the aforementioned light pipe assemblies, and which is constructed in accordance with the principles of the present invention. The connector 500 includes a housing 502 that is preferably formed from an insulative material, which may be injection molded or the like. The housing 502 has a forward engagement portion 504 with a frontal face 506. The forward engagement portion extends forwardly into the interior space of the exterior shielding assembly. The housing illustrated includes a base portion 508 and a top portion 510. The base and top portions 508, 510 extend rearwardly from the forward engagement portion 504 and cooperatively define what may be considered as an internal cavity 511 of the connector that opens to the rear of the connector. (FIG. 31.) The base portion 508 is intended for mounting to a circuit board (not shown) and therefore may preferably include mounting members, like posts 509 and stabilizing lugs 507 extending out from the connector housing sides laterally so the bottom surfaces thereof may abut the circuit board.

Figure 33:
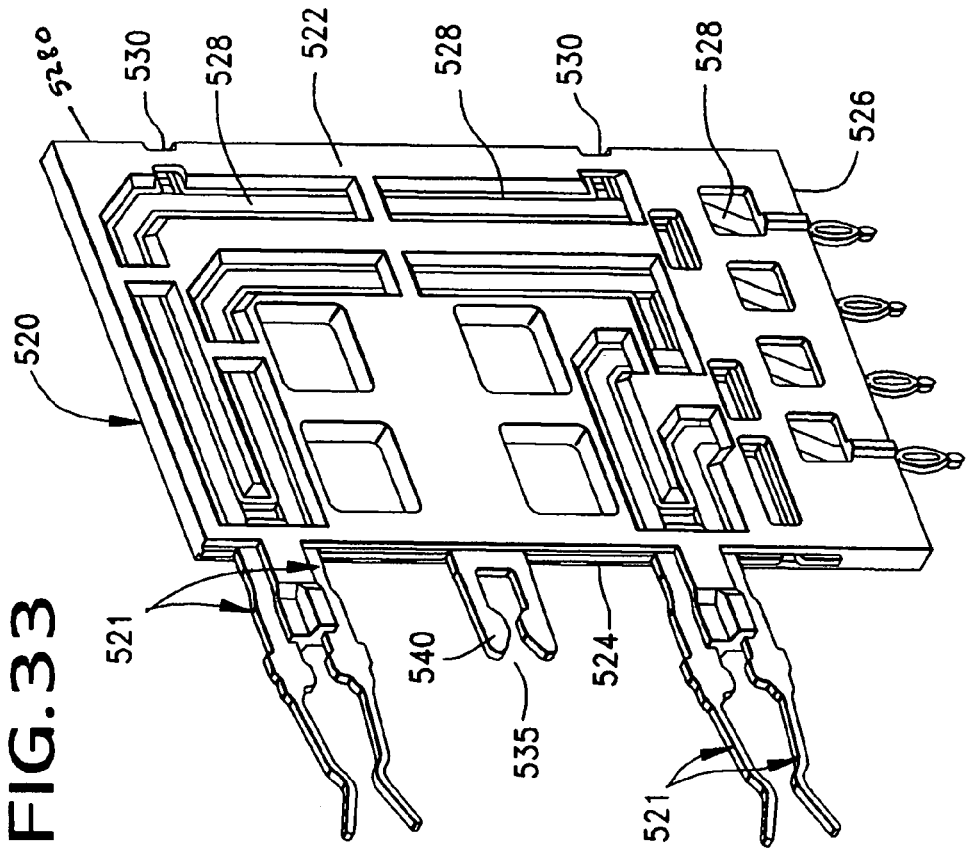
FIG. 33 is a perspective view of a terminal assembly used in the connector of FIG. 29.

The housing internal cavity 511 houses a plurality of terminal assemblies 520, one of which is illustrated best in FIG. 33. As shown in FIG. 33, the terminal assembly 520 includes a plurality of conductive terminals, shown as two pairs of terminals. The terminals 521 of each pair are spaced apart from each other vertically, and the two pairs themselves are likewise spaced apart from each other in the vertical direction. This spacing permits the terminal assemblies 520 to be used in connector 500 of the present invention which are suited for stacked or dual configuration. The terminals 521 are initially supported in a lead frame and inserted into a mold where the terminals 521 are separated and a supporting dielectric frame 522 is molded over portions of the terminals 521, such as by over molding. The dielectric frame 522 provides a measure of thickness to the terminal assembly 520 and defines a body portion of the assembly. The terminals are trimmed into separate terminals by a process known in the art. The terminals are preferably arranged in an inverted-L configuration as shown so as to maintain the depth of the connector at an optimum amount and so as to accommodate the clips 535.

The terminal assembly 520 preferably has a generally square or rectangular configuration, as shown, with four distinct sides. The terminals 521, as shown best in FIG. 34, include contact portions 523 that extend along one side 524 of the assembly 520 and tail portions, shown as compliant pin portions 525, that extend along and out from another side 526 of the terminal assembly 520. These two sides 524, 525 are adjacent each other as shown, although other configurations are suitable. The terminals 521 further include body portions 527 that interconnect the contact portions 523 and the tail portions 525 together and the overall configuration of the terminals 521 of the assembly 520 may be considered is L-shaped. The dielectric frame 522 may include, as best shown in FIG. 33, openings 528 that follow the path of the terminals 521, with one opening tracking one terminal. These openings 528 expose portions of the terminals 521 to air and are suitable for providing an air-terminal interface between selected portions of terminals of the connector. This exposure to air may be used for affecting the impedance of the system in which the connector 500 is used, and particularly the impedance of the terminals 521 of the terminal assemblies 520. The rear edge, or side 5280 of the terminal assemblies 520 may include notches 530, or other suitable openings which may receive a transverse alignment bar (not shown) for maintaining the rear sides 5280 of the terminal assemblies 520 together in alignment as a single group.

Figure 32:
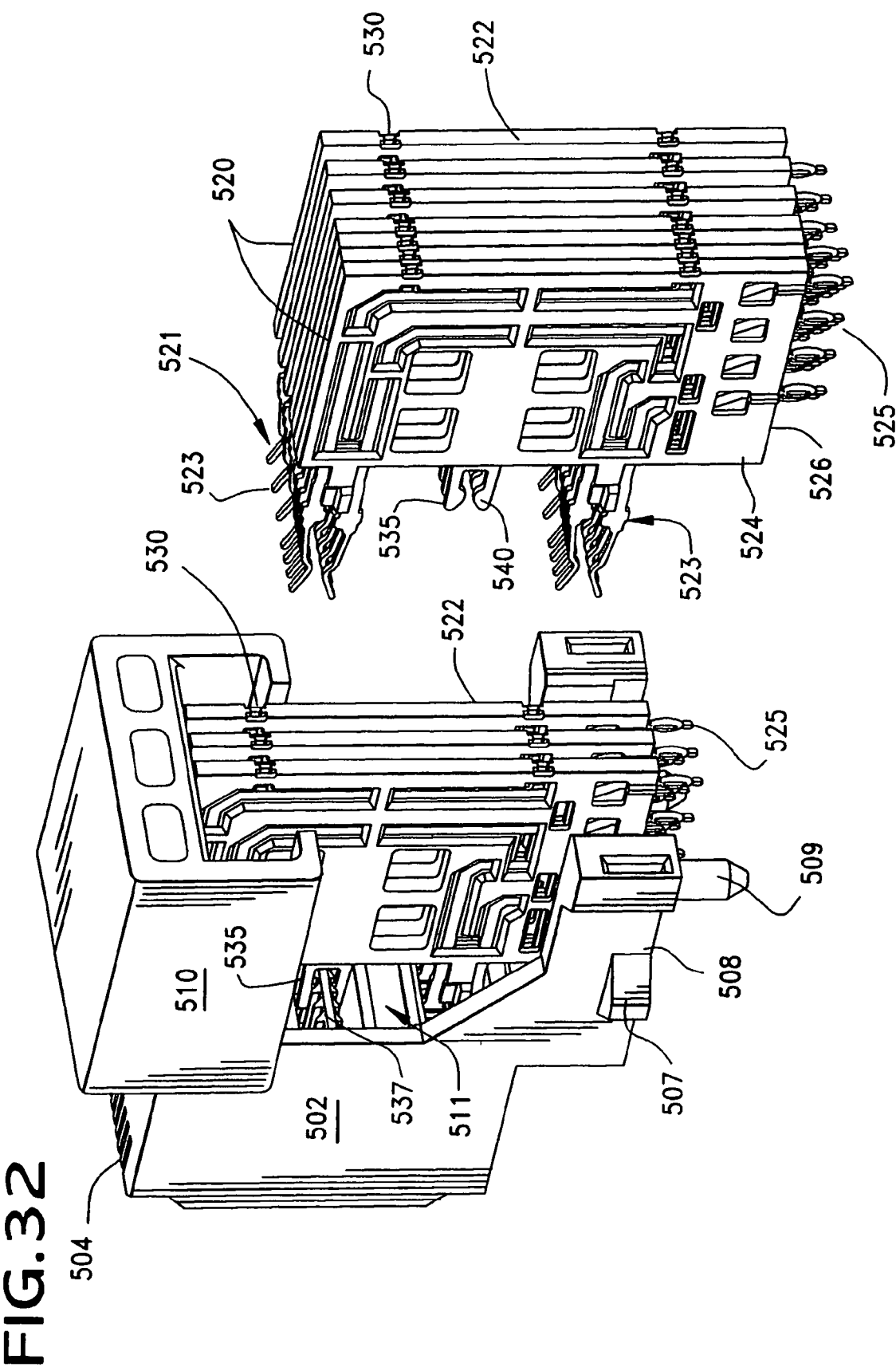
FIG. 32 is a rear perspective view of FIG. 29, with alternating ones of the terminal assemblies illustrated in place within the connector cavity.
Figure 34:
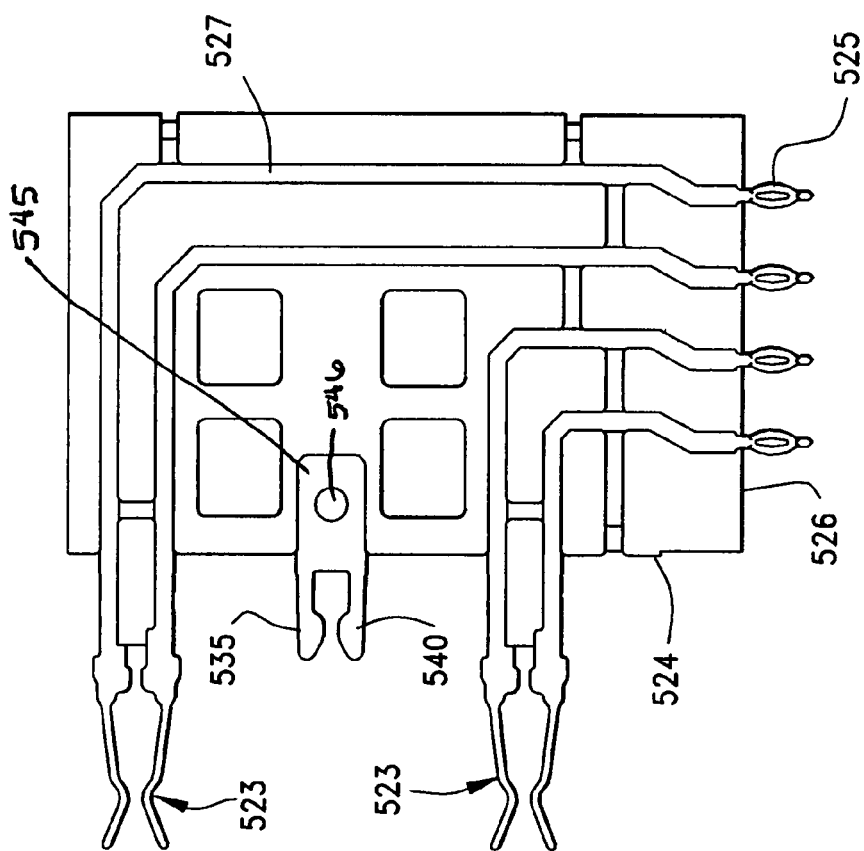
FIG. 34 is a sectional view of the terminal assembly, illustrating the lead frame in place within its insulative skeletal frame.
Figure 35:
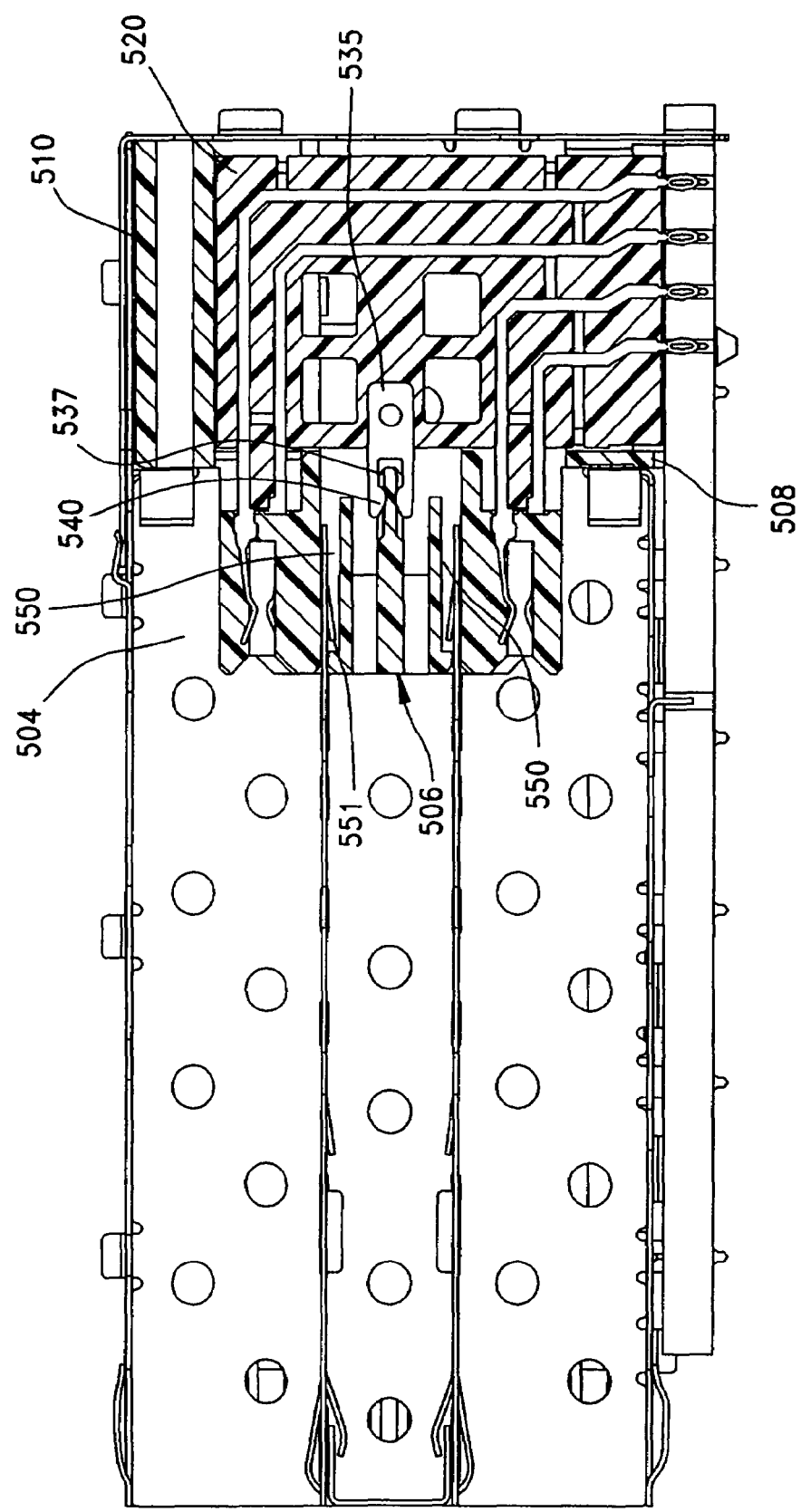
FIG. 35 is a sectional view of the connector of FIG. 29 mounted on a circuit board and disposed within an exterior shielding assembly.

In one important aspect of the invention, and as best illustrated in FIGS. 33 and 34, each terminal assembly 520 is preferably provided with means for engaging the connector housing 502, and this engagement means is illustrated in the drawings as an elongated clip member 535 that is disposed along one side, namely, the front side 524 of the terminal assembly 520. This clip member 535 is disposed between the two sets of terminal contact portions 523 and it also extends forwardly of the terminal assembly frame 522 in order to contact an opposing ledge 537 or similar engagement member that is disposed in the connector housing 502. This engagement member is shown best in FIG. 35 in the form of a shoulder, or bar, 537 that extends horizontally as shown and which projects rearwardly in the internal cavity 511 of the connector housing 502. As shown best in FIG. 32, the shoulder is preferably provided with a plurality of slots 539 (FIG. 31) that are spaced apart from each other widthwise of the connector housing 502, and which extend lengthwise within the connector housing 502 toward the front of the connector 500. Each clip member 535 preferably includes a pair of free ends 540 that are spaced apart (shown in the vertical direction) to define a small bight therebetween, which preferably is less that the thickness of the bar 537 so the clips 535 may engage the bar 537 reliably and exert a positive retention force thereon.

Figure 36:
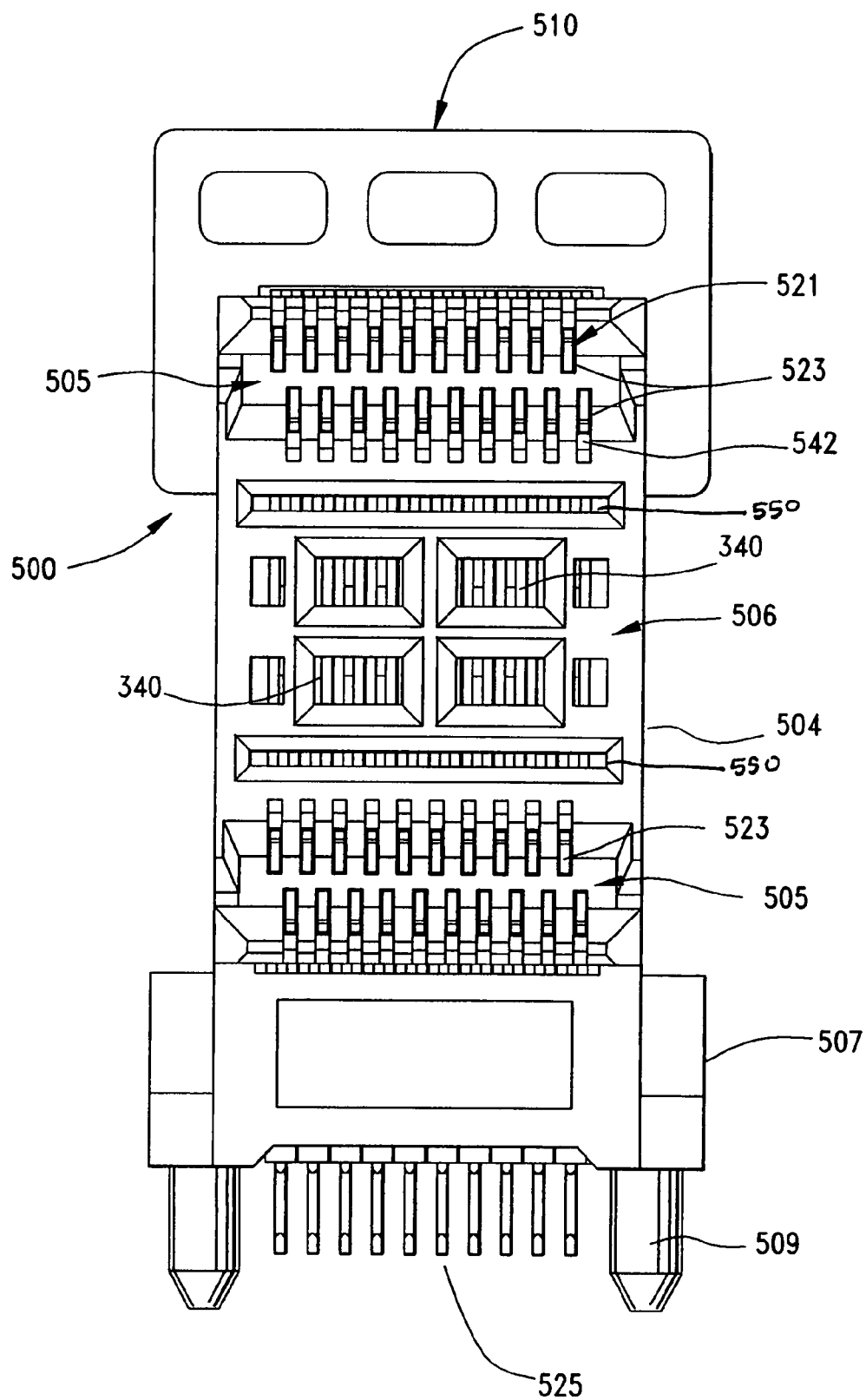
FIG. 36 is a front elevational view of the connector housing of FIG. 29.
Figure 37:
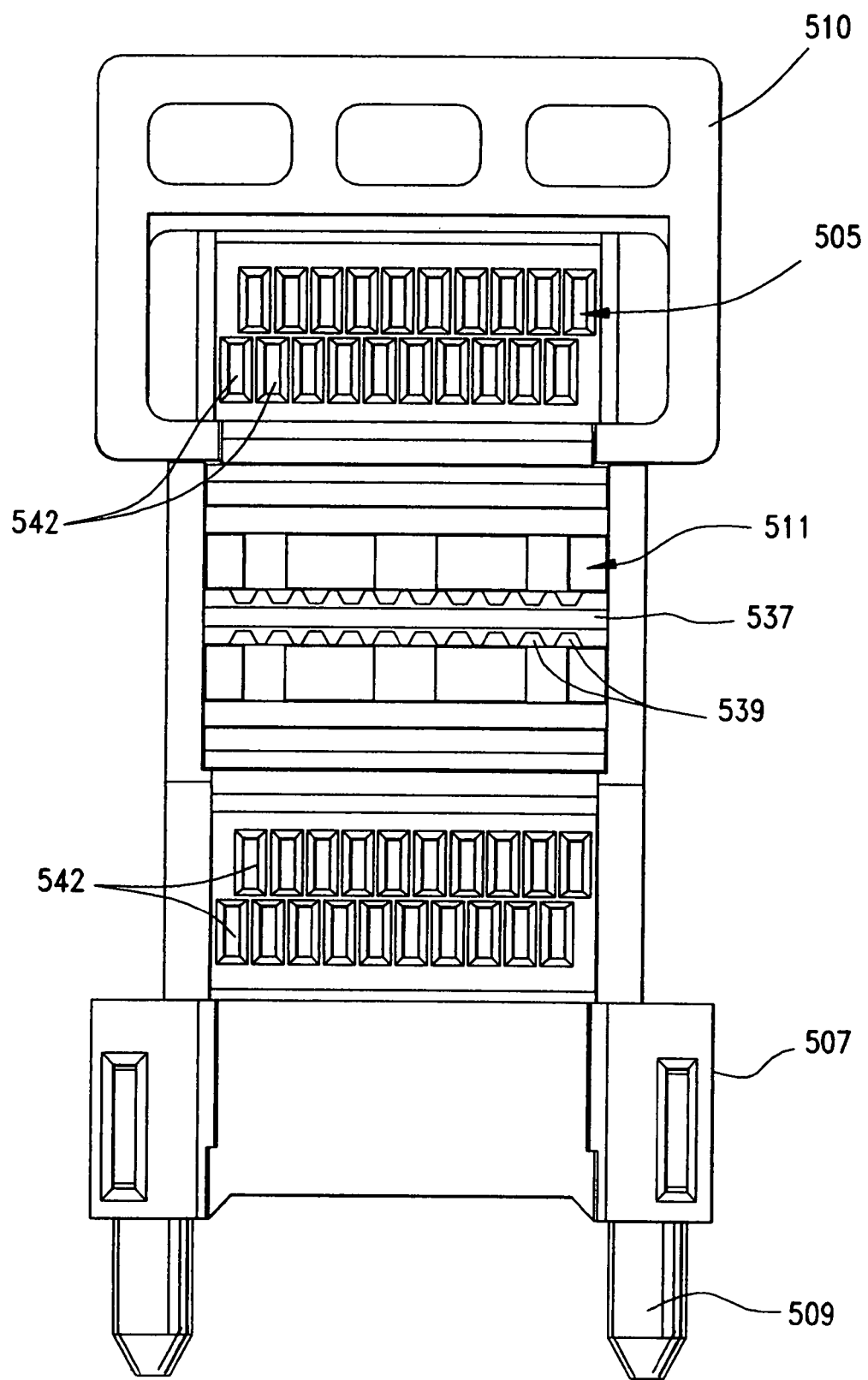
FIG. 37 is a rear elevational view of the connector housing of FIG. 36, but with the terminal assemblies removed to illustrate the interior of the connector housing more clearly.

The terminal contact portions 523 likewise may be received within corresponding terminal-receiving slots 542 that are formed in the connector housing 502 and which are typically disposed on opposite sides (top and bottom) of the card-receiving slots 505. (FIG. 36.) The terminal assembly engagement clip members 535 are preferably formed from a durable metal that is strong enough to maintain a reliable grip on the opposing shoulder 537 of the connector 500. The clip member 535 may be easily molded as an insert into the dielectric frame 522 of the terminal assembly 520, and as illustrated in FIG. 34, may include a wide body portion 545 with an opening 546 formed therein to improve the retention of the clip 535 in the frame 522. The clip members 535 provide a third point of engagement with the connector housing 502, with the first two points of retention being the two sets of the terminal contact portions 523 which are retained within their corresponding terminal-receiving slots 542.

Turning now to FIG. 36, the connector 500 is seen in frontal elevation, which best illustrates the number of engagement portions that are disposed on the connector housing 502 and arranged on the front face 506 thereof. As described above, the connector housing 502 may include openings 340 formed therein that receive the engagement hooks 339 of the light pipe arrays 336a,b. These openings 340 are preferably disposed on the connector front face 506 in the area between the two card edge-receiving slots 505 of the connector 500, and further preferably are disposed in between the shielding assembly engagement openings 550.

Figure 38:
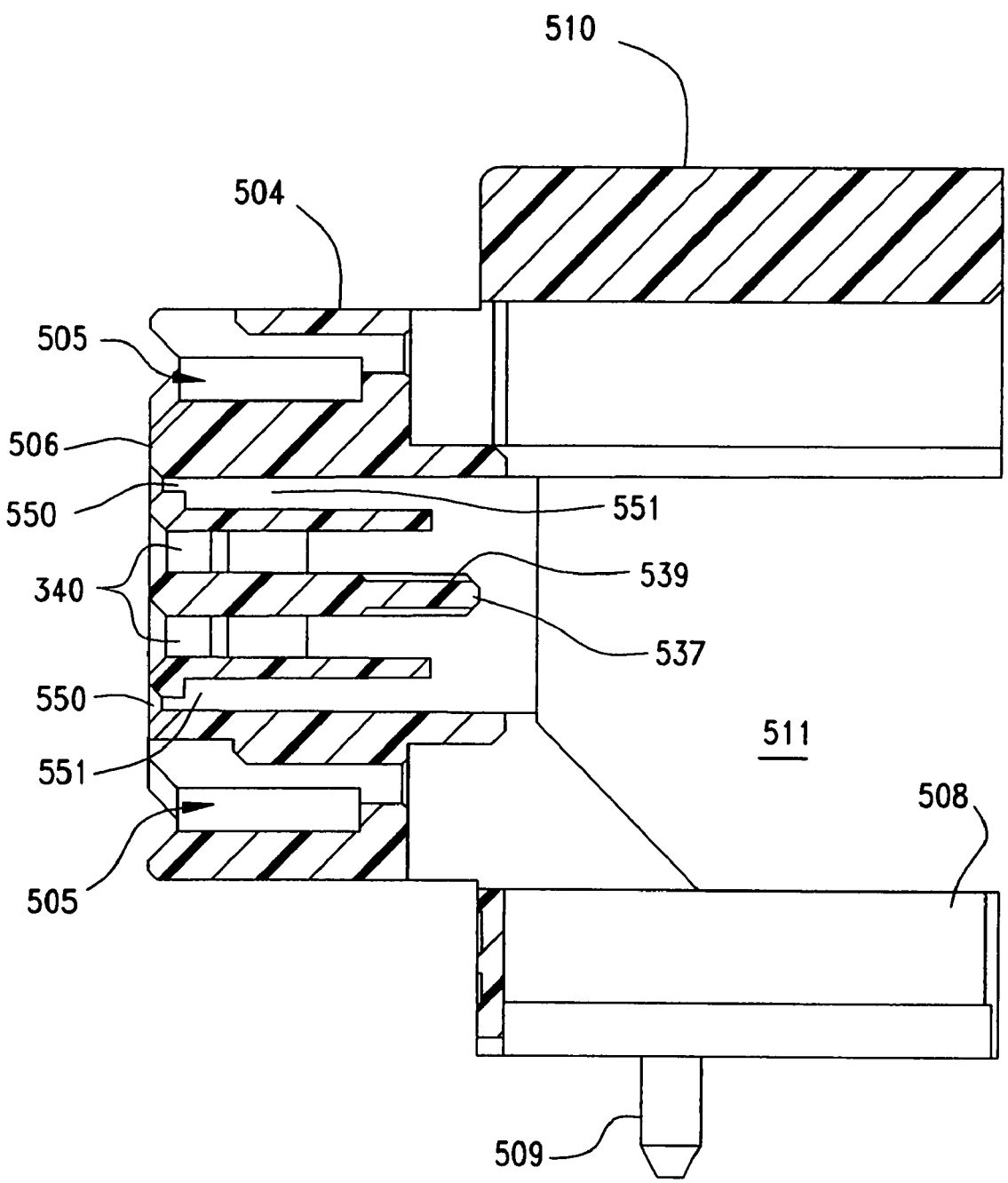
FIG. 38 is a sectional view of the connector housing of FIG. 37.
Figure 39:
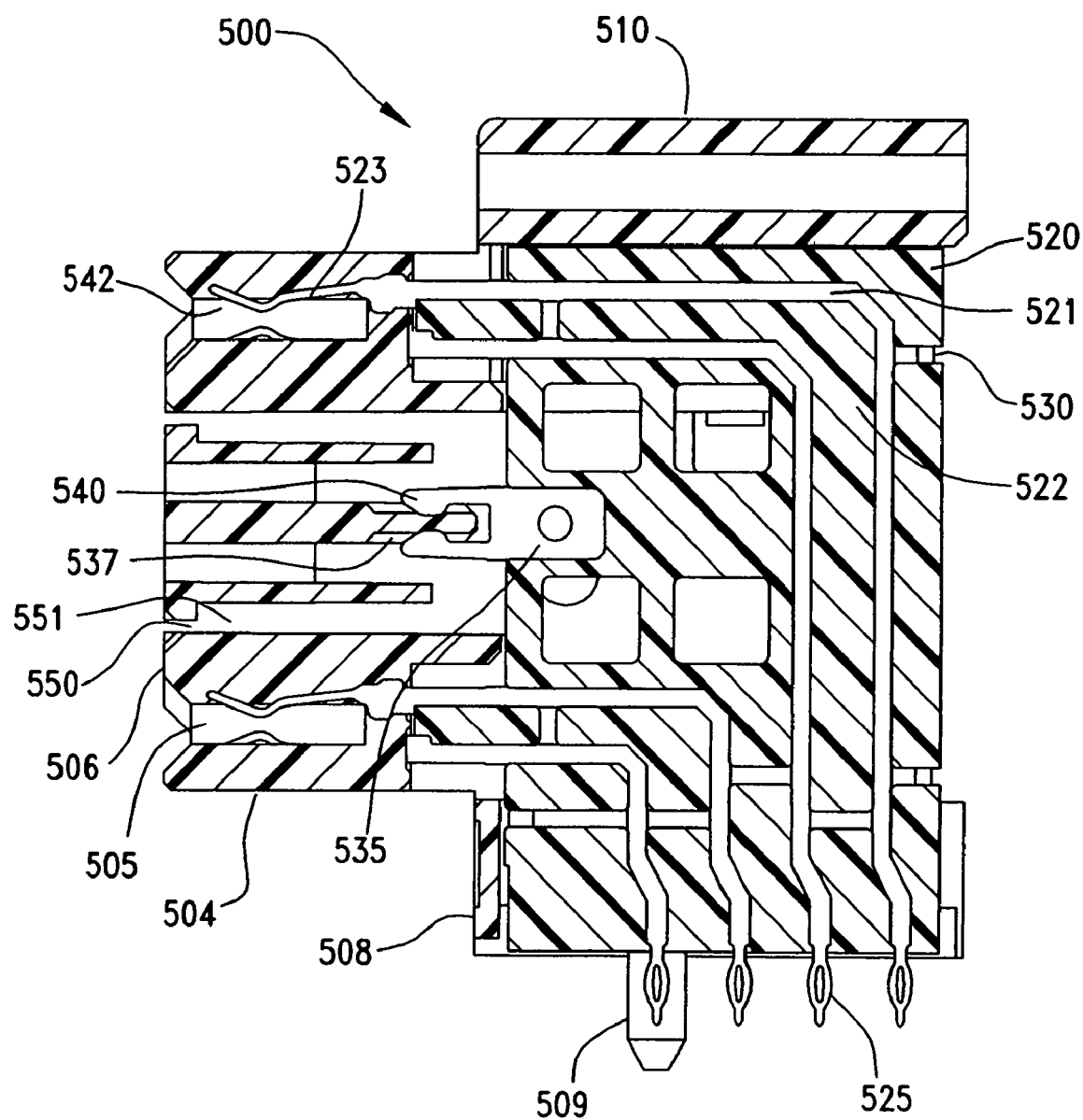
FIG. 39 is a sectional view of the connector assembly of FIG. 36, illustrating a terminal assembly in place within the connector housing internal cavity; and, FIG. 40 is a perspective view of an array of the connectors of the invention in place upon a circuit board and mated together with portions of an exterior shielding assembly.
Figure 40:
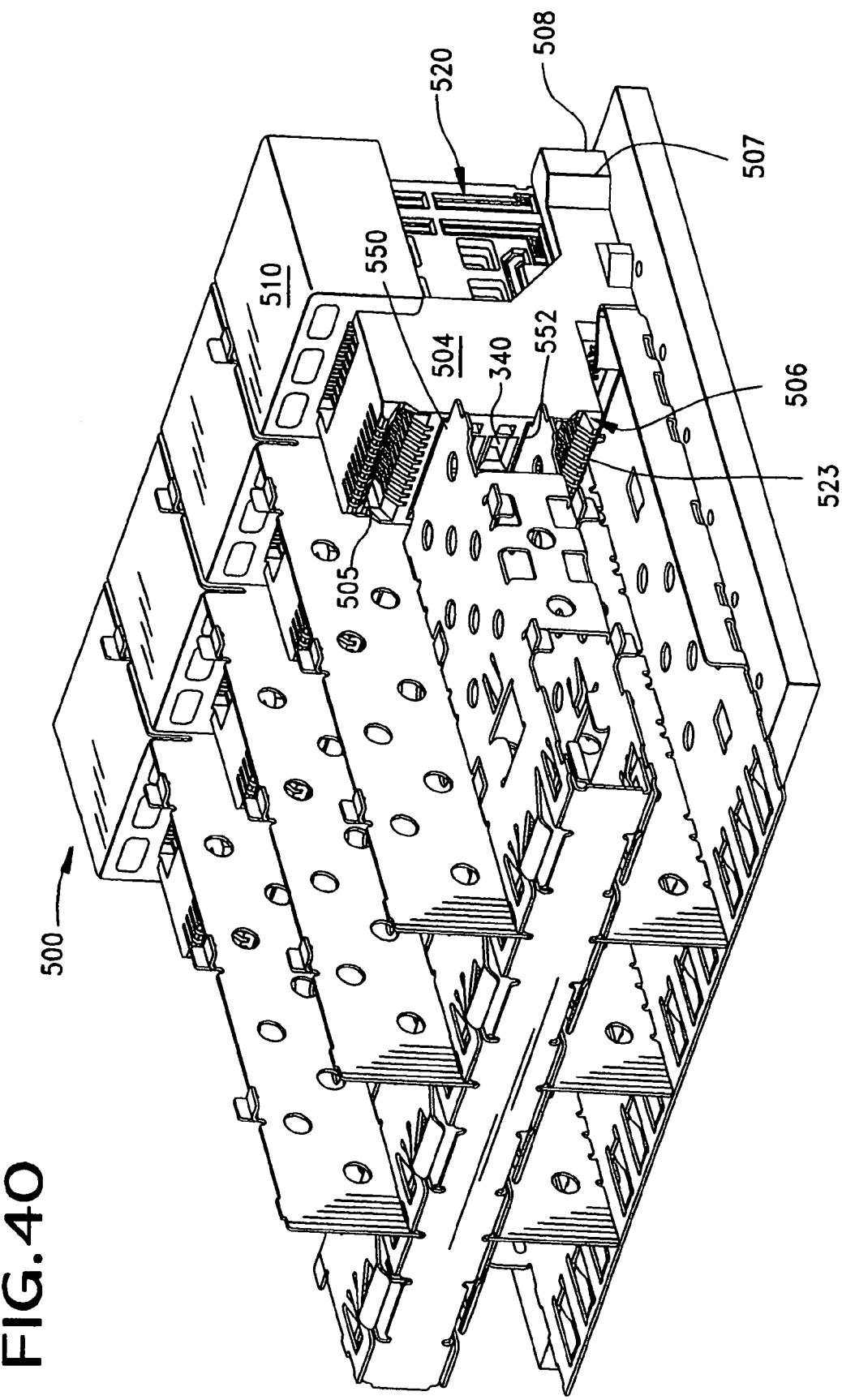

An additional set of openings 550 (FIG. 38) are disposed on the front face 506 and these openings extend horizontally within the connector housing 502. These openings receive engagement members, in the form of tabs or lugs 552 of the portion of the exterior shielding assembly that defines an intervening wall between the two module-receiving bays of the shielding assembly. This is shown best in FIGS. 35 and 40. These slots 550 extend rearwardly in the housing 502 and include an inner ledge 551. This inner ledge 551 provides a shoulder for a tang 553 on the shielding assembly engagement tabs 552 to bear against and retain the shield in place and in alignment with the connector housing 502. Both these openings 550 and the light pipe engagement openings 340. In this manner, the light pipes and the shielding assembly all engage the connector housing 502 in a secure manner so that all of the components will act as a single assembly. In this manner, the light pipes and connector may be assembled as a unit and inserted into the shielding assembly from its rear.

The base portion 508 of the connector housing 502 has an opening that communicates with the internal cavity 511 of the housing 502. This permits the bottom edges 526 of the terminal assemblies 520 to lie flat on the surface of the circuit board, if desired and as shown best in FIG. 35.

While the preferred embodiment of the invention have been shown and described, it will be apparent to those skilled in the art that changes and modifications may be made therein without departing from the spirit of the invention, the scope of which is defined by the appended claims

The invention claimed is:

1. An electrical connector, comprising:

an insulative housing and a connector housing, the connector housing including an internal cavity formed therein that opens to the rear of the connector, said housing including a front face, the front face including a pair of edge card-receiving slots disposed thereon and spaced vertically apart, the edge card-receiving slots being sized to receive mating ends of a component with two mating edge cards that is mateable with said connector;

said connector housing including a plurality of terminal-receiving channels disposed therein on opposite sides of said slots, each of the terminal-receiving channels receiving a single conductive terminal therein;

said connector housing further including at least one opening disposed on the connector housing front face, the opening being sized to receive an engagement member of an exterior shielding member.

2. The connector of claim 1, wherein said connector further includes a plurality of terminal assemblies supporting said terminals in distinct arrangements of terminal pairs, each terminal pair being associated with one or the other of said edge card-receiving slots, the terminal assemblies including an insulative support frame that supports said terminals in distinct pairs of terminals thereon, the terminals having contact portions that project from first edges of said support frames and tail portions that project from second edges of said support frames.

3. The connector of claim 2, wherein said terminal contact portions project from said support frame first edges and are received within corresponding terminal-receiving cavities flanking said edge card-receiving slots of said connector housing.

4. The connector of claim 2, wherein said terminal assembly support frame first and second edges are adjacent each other.

5. The connector of claim 1, wherein said terminals have a general inverted L-shape, with their contact portions and said tail portions being disposed at opposite ends of said terminals, said contact and tail portions being disposed at an angle to each other.

6. The connector of claim 2, wherein said connector housing includes an inner ledge disposed in said connector housing internal cavity and interposed between said two card-receiving slots, and each of said terminal assemblies including a clip for engaging the connector housing inner ledge , the clip being disposed between said terminal contact portions and extending out from said terminal assembly first edge.

7. The connector of claim 1, wherein said openings are disposed on said connector housing front face.

8. An electrical connector, comprising:

an insulative connector housing, the connector housing including at least a pair of side walls and front wall, the side and front walls cooperatively defining a hollow interior of said connector housing, the front wall including a pair of edge card-receiving slots spaced vertically apart thereon, the card-receiving slots being sized to receive mating ends of a pair of edges cards projecting a component that is mateable with said connector, said edge card-receiving slots opening to the connector housing hollow interior;

a plurality of terminal assemblies disposed in said connector housing hollow interior, each of the terminal assemblies including a discrete, dielectric body supporting a plurality of inverted, L-shaped, conductive terminals arranged in pairs of terminals, the terminals including contact portions extending therefrom at least partially through said connector housing front wall on opposite sides of said edge card-receiving slots, and tail portions extending out from bottoms of said terminal assemblies, the terminal contact and tail portions being interconnected by body portions supported by the dielectric bodies, said dielectric bodies including a plurality of openings that track paths of said terminal body portions through said dielectric bodies so that portion of said terminal body portion with said terminal assembly dielectric bodies are exposed to air.

9. The connector of claim 8, wherein each of said terminal assemblies include an engagement clip disposed between two pairs of terminal contact portions for engaging a portion of said connector housing front wall.

* * * * *

UNITED STATES PATENT AND TRADEMARK OFFICE
CERTIFICATE OF CORRECTION

| | | |
|---|---|---|
| PATENT NO. | : 7,467,972 B2 | Page 1 of 1 |
| APPLICATION NO. | : 11/881869 | |
| DATED | : December 23, 2008 | |
| INVENTOR(S) | : Jerry A. Long | |

It is certified that error appears in the above-identified patent and that said Letters Patent is hereby corrected as shown below:

Title Page; item (63), Please add;
This application is a continuation of United States Patent No. 7,249,966, filed May 16, 2005, which claims priority of prior United States Provisional Patent Applications Nos. 60/571,375, filed May 14, 2004 and 60/584,420, filed June 30, 2004 and 60/584,421, also filed June 30, 2004.

Signed and Sealed this
Twelfth Day of July, 2011

David J. Kappos
*Director of the United States Patent and Trademark Office*